United States Patent
Franks et al.

(10) Patent No.: US 8,108,417 B2
(45) Date of Patent: Jan. 31, 2012

(54) DISCOVERING AND SCORING RELATIONSHIPS EXTRACTED FROM HUMAN GENERATED LISTS

(75) Inventors: Kasian Franks, Kensington, CA (US); Mike Muldoon, Emeryville, CA (US); Raf Podowski, Pleasant Hill, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 512 days.

(21) Appl. No.: 12/062,421

(22) Filed: Apr. 3, 2008

(65) Prior Publication Data

US 2008/0250039 A1 Oct. 9, 2008

Related U.S. Application Data

(60) Provisional application No. 60/910,123, filed on Apr. 4, 2007.

(51) Int. Cl.
G06F 7/06 (2006.01)
G06F 17/30 (2006.01)

(52) U.S. Cl. ........................................ 707/765; 707/803
(58) Field of Classification Search .................. 707/776, 707/803, 765
See application file for complete search history.

(56) References Cited

U.S. PATENT DOCUMENTS

| | | | |
|---|---|---|---|
| 6,026,388 A | 2/2000 | Liddy et al. | |
| 6,523,026 B1 | 2/2003 | Gillis | |
| 6,687,690 B2 | 2/2004 | Kelkar | |
| 7,548,934 B1 * | 6/2009 | Platt et al. | 707/999.102 |
| 2002/0188599 A1 | 12/2002 | McGreevy et al. | |
| 2003/0033288 A1 | 2/2003 | Shanahan et al. | |
| 2004/0064471 A1 | 4/2004 | Brown et al. | |
| 2005/0038819 A1 | 2/2005 | Hicken et al. | |
| 2005/0120011 A1 | 6/2005 | Dehlinger et al. | |
| 2006/0036593 A1 | 2/2006 | Dean et al. | |
| 2006/0129531 A1 | 6/2006 | Bates et al. | |
| 2006/0143236 A1 * | 6/2006 | Wu | 707/104.1 |
| 2006/0265349 A1 | 11/2006 | Hicken | |
| 2007/0014537 A1 | 1/2007 | Wesemann | |
| 2007/0033225 A1 | 2/2007 | Davis | |
| 2007/0106660 A1 | 5/2007 | Stern et al. | |

FOREIGN PATENT DOCUMENTS

WO WO 2006/133050 * 12/2006

OTHER PUBLICATIONS

Ragno, Inferring Similarity Between Music Objects with Application to Playlist Generation, Nov. 11, 2005, pp. 1-9.*

(Continued)

Primary Examiner — Shahid Alam
Assistant Examiner — Albert Phillips, III
(74) Attorney, Agent, or Firm — Finnegan, Henderson, Farabow, Garrett & Dunner LLP

(57) ABSTRACT

A computer-implemented system and method for extracting Human Generated Lists from an electronic database is described. The system searches for objects of the same class within a context window to identify Human Generated Lists and stores them to an archive. The archive may be used to generate a relationship network. The system generates variable length data vectors to represent the relationships between the objects within each Human Generated List. This relationship network can then be queried to discover relationships between the objects in the Human Generated Lists and to provide related objects as recommendations.

13 Claims, 23 Drawing Sheets

OTHER PUBLICATIONS

Sullivan, What are Stop Words, Jan. 1, 2003, pp. 1-3.*
International Search Report and Written Opinion for PCT/US2006/21662 dated Mar. 13, 2007.
International Search Report and Written Opinion for PCT/US2007/083992 dated May 16, 2008.
International Search Report and Written Opinion for PCT/US2007/082892 dated Jun. 24, 2008.
International Search Report and Written Opinion for PCT/US2008/059308 dated Jul. 2, 2008.
Baccigalupo et al., "Case-based sequential ordering of songs for playlist recommendation" Advances in Case-Based Reasoning. 8$^{th}$ European Conference, ECCBR 2006 Proceedings Sep. 4-7, 2006 Fethiye, Turkey, [Online].
Dou Shen et al. "Thread detection in dynamic text message streams", SIGIR '06: Proceedings of the 29$^{th}$ Annual International ACM SIGIR Conference on Research and Development in Information Retrieval [Online] Aug. 2006.
Kolda et al. "A Semidiscrete Matrix Decomposition for Latent Semantic Indexing in Information Retrieval" ACM Transactions on Information Systems, ACM, New York, NY, vol. 16, No. 4, Oct. 1, 1998. pp. 322-346.
International Search Report and Written Opinion for PCT Application No. PCT/US2008/068401 dated Sep. 30, 2008.

* cited by examiner

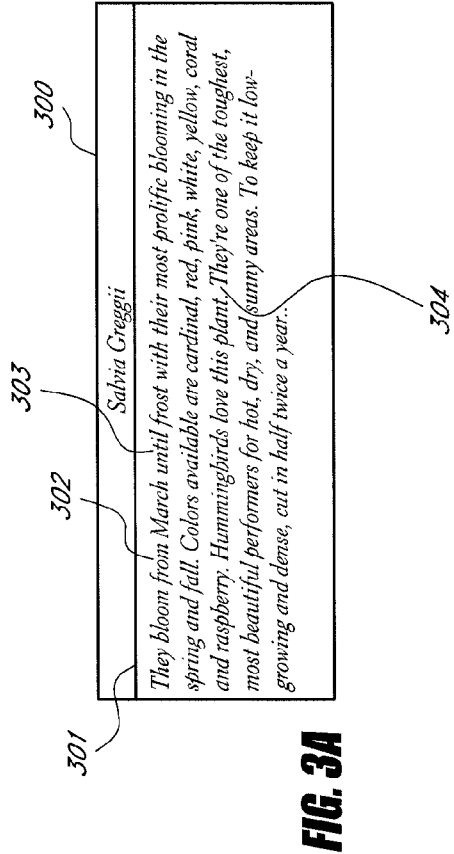

300: Salvia Greggii

They bloom from March until frost with their most prolific blooming in the spring and fall. Colors available are cardinal, red, pink, white, yellow, coral and raspberry. Hummingbirds love this plant. They're one of the toughest, most beautiful performers for hot, dry, and sunny areas. To keep it low-growing and dense, cut in half twice a year.

| Doc. ID | Term 1 | Term 2 | Term 3 | Term 4 | Term 5 | Term 6 | Term 7 | Term 8 | Term 9 |
|---|---|---|---|---|---|---|---|---|---|
| Salvia Greggii | bloom | March | frost | Prolific | blooming | Spring | fall | | |
| Salvia Greggii | Colors | available | cardinal | Red | pink | White | yellow | coral | raspberry |
| Salvia Greggii | Hummingbirds | Love | plant | | | | | | |
| Salvia Greggii | one | toughest | beautiful | Performers | hot | Dry | sunny | areas | |
| Salvia Greggii | keep | low | growing | Dense | cut | Half | twice | year | |
| * * * | | | | | | | | | |

FIG. 4

| Doc ID | Term 1 | Term 2 | Term 3 | Term 4 | Term 5 | Term 6 | Term 7 | Term 8 | Term 9 |
|---|---|---|---|---|---|---|---|---|---|
| Salvia Greggii | bloom | March | frost | Prolific | blooming | Spring | fall | | |
| Salvia Greggii | Colors | available | cardinal | Red | pink | White | yellow | coral | raspberry |
| Salvia Greggii | Hummingbirds | Love | plant | Performers | hot | Dry | sunny | areas | |
| Salvia Greggii | one | toughest | beautiful | Dense | cut | Half | twice | year | |
| Salvia Greggii | keep | low | growing | | | | | | |
| * * * | | | | | | | | | |

FIG. 5

| Term Statistics: | |
|---|---|
| # Occurrences in Analyzed Text | 1 |
| # Sentences | 1 |
| # Associated Terms | 18 |
| # Individual Associations | 18 |

| Document Statistics: | | |
|---|---|---|
| Document ID | Sentences | Total Score |
| Salvia Greggii | 1 | 1 |

| Associated Term Statistics: | | |
|---|---|---|
| Associated Term | #Associations | Distance Score |
| Cardinal | 1 | 0.618 |
| Pink | 1 | 0.618 |
| White | 1 | 0.381 |
| * * * | | |
| Plant | 1 | 0.021 |
| March | 1 | 0.013 |
| Bloom | 1 | 0.008 |

| Term Statistics: | | |
|---|---|---|
| # Occurrences in Analyzed Text | 12 | |
| # Sentences | 12 | |
| # Associated Terms | 319 | |
| # Individual Associations | 450 | |
| Document Statistics: | | |
| Document ID | Sentences | Total Score |
| Gardening Journal | 4 | 4 |
| Salvia Greggii | 3 | 3 |
| * * * | | |
| Top News Stories | 1 | 1 |
| Related Term Statistics: | | |
| Related Term | # Asssociations | Distance Score |
| Cardinal | 6 | 4.124 |
| Maroon | 2 | 2.000 |
| Pink | 4 | 1.641 |
| Raspberry | 2 | 1.381 |
| White | 5 | 1.347 |
| * * * | | |
| Paste | 1 | 0.008 |

FIG. 6A

| Rank | Term | Relationship Score |
|---|---|---|
| 1 | Cardinal | 1.052 |
| 2 | Maroon | 1.029 |
| 3 | Pink | 1.013 |
| 4 | Raspberry | 0.984 |
| 5 | White | 0.947 |
| | * * * | |
| 319 | Paste | 0.014 |

FIG. 6B

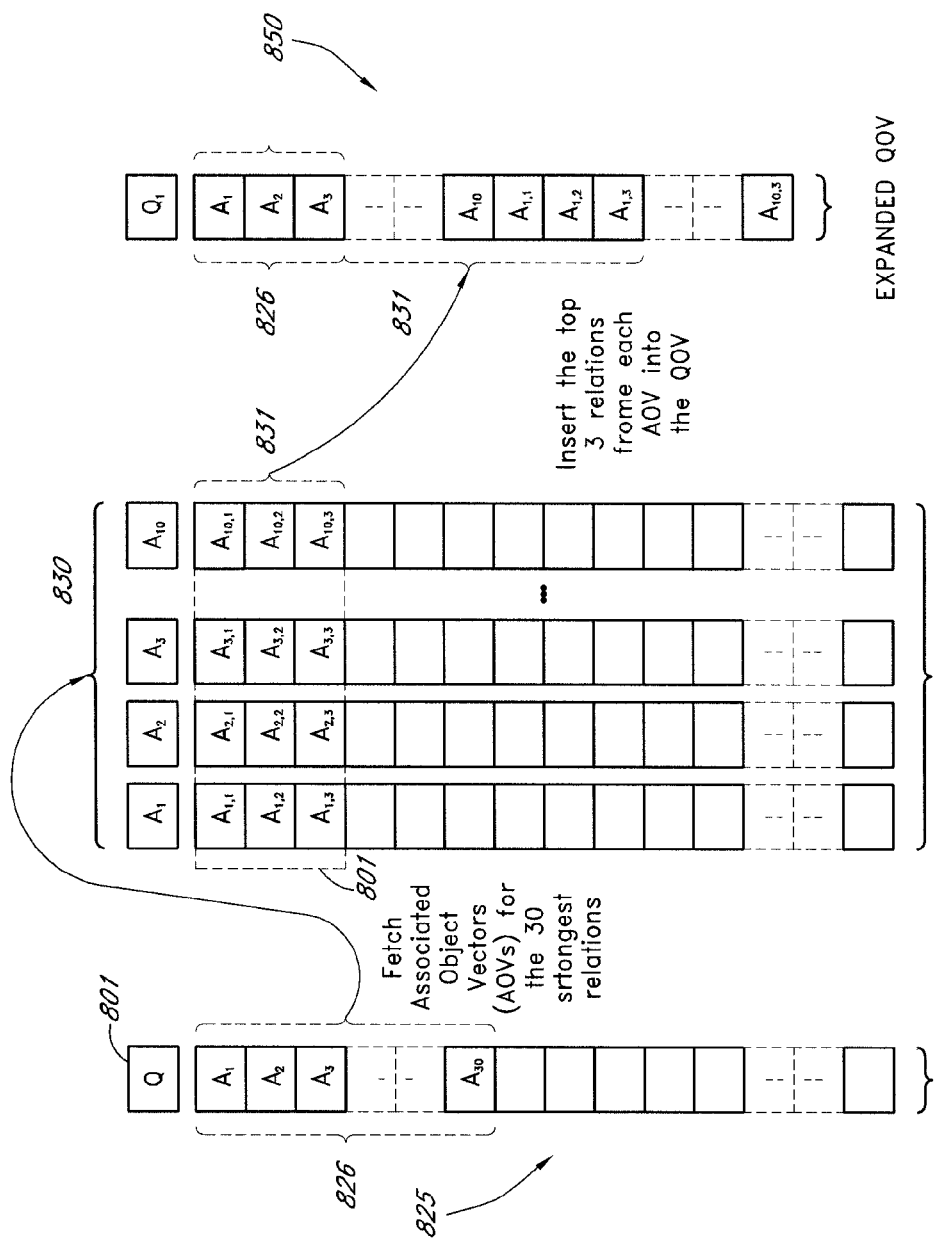

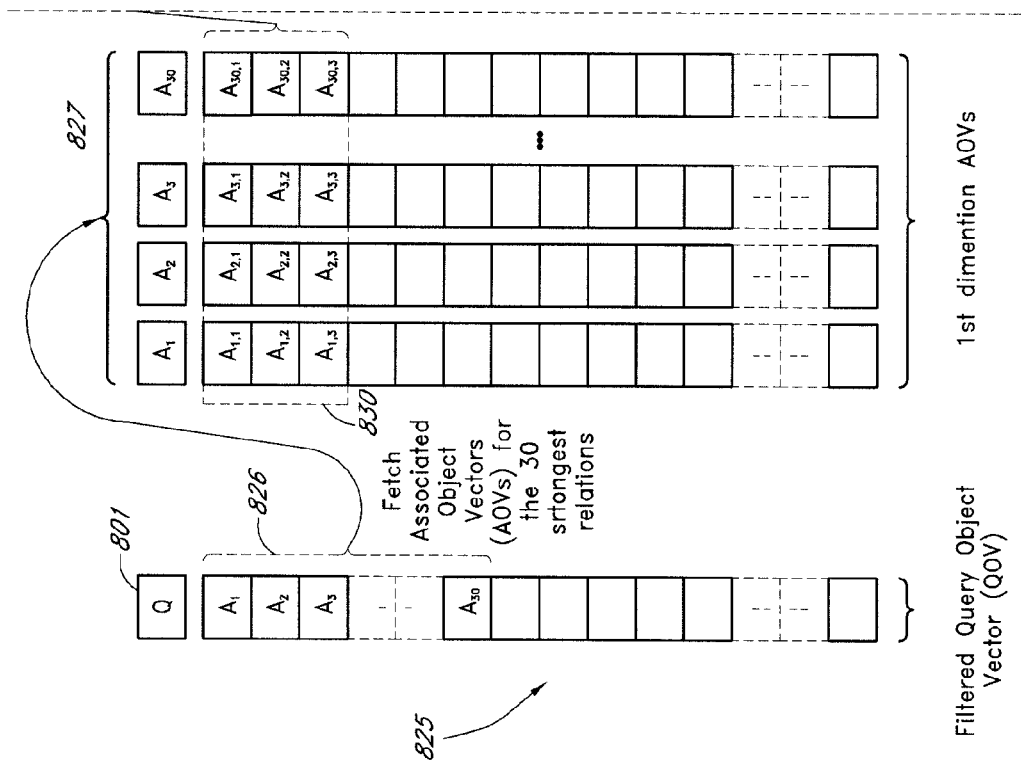
FIG.8C-A
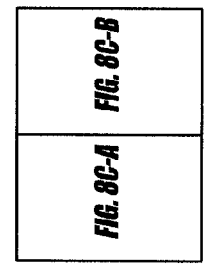
FIG.8C

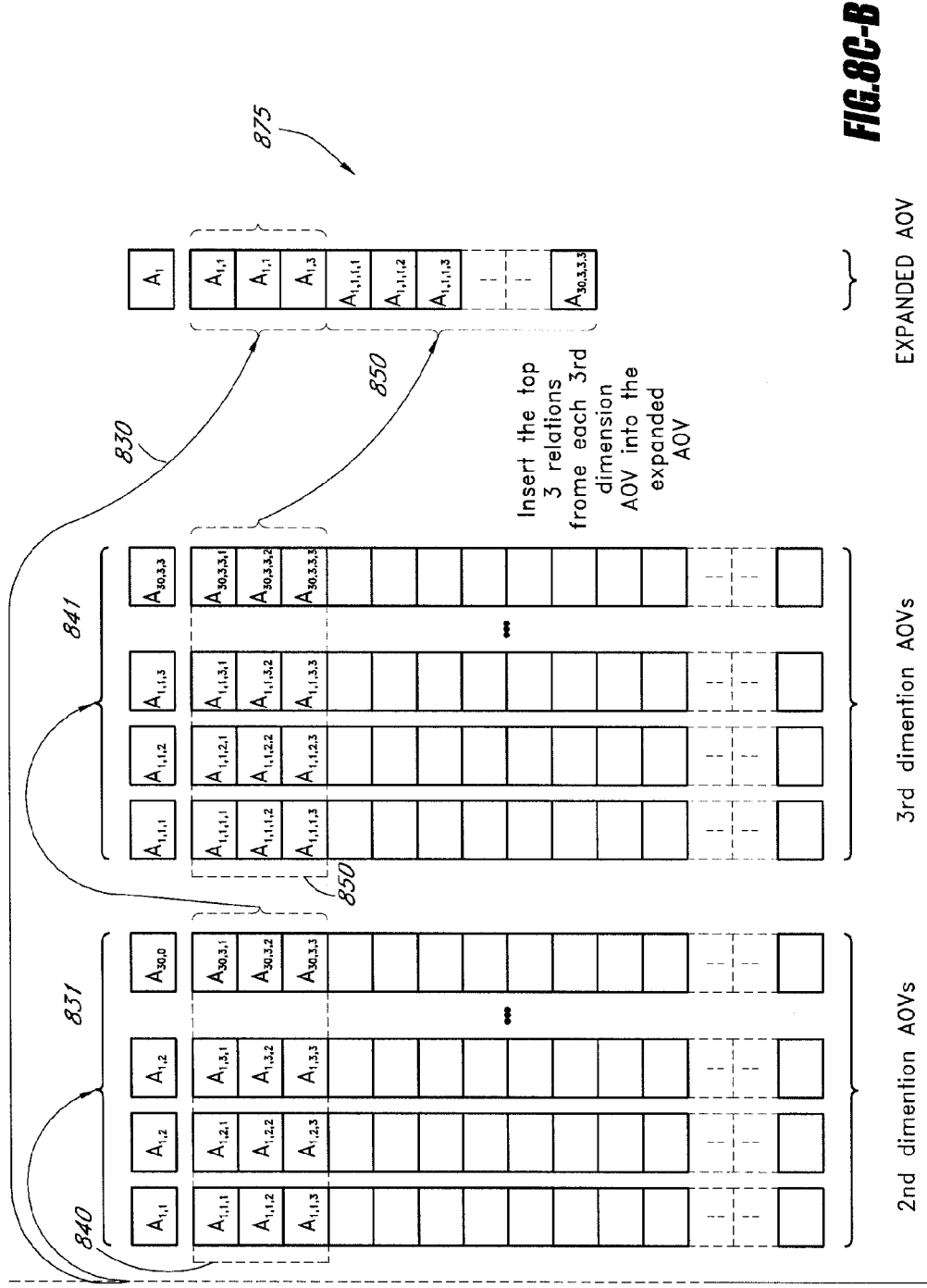

DISCOVERING AND SCORING RELATIONSHIPS EXTRACTED FROM HUMAN GENERATED LISTS

CROSS-REFERENCE TO RELATED APPLICATIONS

This application claims the benefit of U.S. Provisional Patent Application No. 60/910,123, filed on Apr. 4, 2007, the disclosure of which is incorporated by reference herein in its entirety.

BACKGROUND OF THE INVENTION

1. Field of the Invention

This application relates to vector-based information storage and retrieval systems. More particularly, this application relates to a system for extracting Human Generated Lists from an electronic database and constructing a relationship network from the Human Generated Lists that can be utilized in order to return objects related to a user query.

2. Description of the Related Art

Phrase based or keyword searching is a common method of searching used for electronic data. Keyword searching searches throughout an information database for instances of the words in the search query. Keyword searching does not, however, give results based on relevance; search query results often include items with no relevance or relationship to one another other than the instance of a word in the search query. For example, a user intending to search products by the technology company APPLE may enter the search query "Apple." The search results, however, would likely include items relating to the apple fruit, songs by the music label Apple, and so on. Consequently, the search query results of phrase based searching often have nothing in common with the user's search intent.

Search methods which relate one object to another object are often used in place of keyword searching in order to provide search query results relevant to the searcher's intent. Such relationship-based search methods vary widely and range from precise to general catch-all approaches. Methods relating text objects can vary widely in precision and approach, quality and quantity. For example, Caid et al., in U.S. Pat. No. 5,619,709, titled "System and Method of Context Vector Generation and Retrieval" relies on context vector generations and dated neural network approaches as opposed to more advanced auto-associative approaches. Weissman et al, in U.S. Pat. No. 6,816,857, uses methods of distance calculation to determine relationships for the purpose of placing meaning-based advertising on websites or to rate document relevance in currently used search engines.

These relationship based searches do not however simulate the process that a human would use in analyzing relevant information to relate objects with one another. Starting with an object of interest, a researcher typically researches within certain contexts and forms relationships between information gathered during the process of reading and analyzing literature. During this flexible process, the context of interest may change, become refined or shift and take on a new direction depending on the information found or thought processes of the researcher. After the researcher finishes the research process, he is left with a valuable collection of information that is related to a specific theme or context of interest. For example, if the researcher's object of interest was a period of music and the context was the Baroque style, then a researcher might relate compositions to one another, compositions to a composer, compositions to a geographical location or time period. Common relationship-based searches do not simulate this process because they are both inflexible and non-interactive; they neither allow a user to define and control the context and individual relationships during the search, nor do they allow for the quality and quantity of relationships to be determined and visualized interactively by the user.

Furthermore, these searches do not take advantage of relationship information intrinsic to certain types of documents, such as a Human Generated List (HGL). HGLs are collections of non-randomly ordered objects compiled by humans. For example, a compilation CD contains a collection of songs that the creator believed were related in some way. The relationship in this example may be that all the songs are performed by the same artist or of the same genre. Such an HGL contains intrinsic intelligence because the objects in the HGL were chosen based on an existing relationship known at least to the creator of the list. Documents containing this type of intrinsic intelligence may provide more valuable relationship information than other documents.

However, in the absence of large-scale collections of such documents, analysis is not statistically meaningful. With large-scale collections, relationships become reinforced and context may be contained within the collection. With HGLs, large-scale collections were not practical prior to the appearance of HGLs on the internet and in other electronic forms, a relatively recent phenomenon. It is now common to find web pages containing lists of different individuals' favorite movies in a particular genre, music playlists created for an electronic media player, or other HGLs. Existing searches do not effectively identify these HGLs, and do not determine the quantity and quality of relationships between objects in these HGLs.

Existing analysis on HGLs is generally confined to limited analysis of formatted lists. For example, an internet website may ask users to rate or rank movies, and then may compare the user ratings to make recommendations. However, these applications don't reveal hidden and non-obvious relationships. These systems also do not take advantage of HGL content available in non-standard formats, which is easier to acquire than formatted data. Consequently, these systems require a substantial amount of work be performed by users before the information can become relatively useful.

SUMMARY OF CERTAIN INVENTIVE ASPECTS

Certain embodiments herein provide for a system and computer-implemented method for extracting HGLs from an electronic database. Certain embodiments also provide for a system and computer-implemented method for the analysis, design and implementation of vectors created from an archive of HGLs for use with relationship networks.

In one embodiment, a system to determine whether an object in an electronic database is an HGL is provided. First, an electronic database containing a variety of objects are obtained, for example from a known repository of HGLs. The electronic database is then processed by defining a context window over a segment of the database. HGLs are identified in the context window by the appearance of multiple objects from the same class. When an HGL is identified, the HGL is stored in an HGL archive. After the entire electronic database has been processed, the HGL archive contains a collection of each HGL from the electronic database.

In one embodiment, a system to determine relationships between objects in an HGL archive is provided. First, objects in an HGL archive are obtained. The objects are then processed by filtering out irrelevant data and calculating the distance between objects. The distance metric may, for example, be an exponential decay calculation. The distance scores are then used to create a relationship score value for relationships between objects. Vectors using the relationship score values are generated and stored. In certain embodiments, the variable length vectors may store data that represents the distance between objects within a specified context window with respect to an operative object. Since each object within a vector may have its own vector, the vectors may then be used to build an HGL relationship network. Furthermore, the organization of connections between objects in the relationship network can be utilized for searching, visualization or other interpretation by a user. In certain embodiments, unique objects may be highlighted, while in other embodiments, common objects may be highlighted.

In another embodiment, a network generation engine for finding relationships is provided. When operating on intersecting attributes found between two or more vectors, the network generation engine is able to identify obvious, unique and hidden relationships between objects in an HGL archive.

In one embodiment, the network generation engine may be implemented on an HGL network containing a set of vectors formed from an HGL archive. An input query object is used as a guide to extract all direct and associated relationships from the HGL network for the query object. The engine may score and rank these relationships and measure the similarity score of any intersecting objects, then build another relationship network showing the relationship of the query object to other objects and the strength of their relationship using the similarity score. The resulting relationship network of the query objects can be visualized if necessary for further interpretation. To ensure that the submitted objects or objects stay within a specific context when a relationship network is being built, a thematic context in the form of a filter can be used to control the kind of relationships extracted within the resulting network. The resulting relationship network may also be used to find the objects most closely related with the query object, and return those objects as search results or recommendations.

In another embodiment, an HGL network is utilized by a recommendation search engine page. The search engine allows the user to obtain recommendations of songs, artists, or albums he or she is likely to enjoy based upon a user provided query object. A user provides the query object, such as a song title, and a vector corresponding to that object is extracted from the HGL network. Direct and associated relationships between the query object and other objects in the HGL network are extracted and scored. High ranking objects are returned as recommendations to the user. In some embodiments, these recommendations are provided with a means for purchasing the recommended objects.

In another embodiment, a computer-implemented method of generating an electronic collection of human generated lists is provided. The method comprises obtaining an electronic database; selecting a first record in the electronic database; determining whether the first record contains at least one human generated list, wherein if the record contains at least one human generated list, storing data corresponding to the at least one human generated list to an electronic collection of human generated lists.

In another embodiment, a computer-implemented method of providing a recommendation in response to a user query is provided. The method includes providing a human generated list archive comprising a plurality of ordered human generated lists, wherein each human generated list comprises a plurality of objects; receiving a user query; matching the query against the human generated list archive to retrieve a recommendation; and providing the recommendation to the user.

In another embodiment, a computer-implemented system for providing recommended media objects in response to a query object is provided. The system comprises a storage containing a human generated list network, the human generated list network comprising vector representations of direct relationships between media objects and a vector processor configured to determine a plurality of indirect relationships between the media objects based on the vector representations of direct relationships. A score generator is configured to generate a plurality of scores, the scores associated with the direct and indirect relationships between media objects, and an object selector configured to select a set of the media objects based upon the scores associated with the direct and indirect relationships between the media objects and the query object. The system also includes a display configured to display the selected set of media objects.

In another embodiment, a computer-implemented system for providing recommended media objects in response to a user query is provided. The system comprises means for providing a human generated list archive comprising a plurality of ordered human generated lists, wherein each human generated list comprises a plurality of objects, and means for receiving a user query. The system further includes means for matching the query against the human generated list archive to retrieve a recommendation, and means for providing the recommendation to the user.

BRIEF DESCRIPTION OF THE DRAWINGS

FIG. 3A shows a sample document from an information database containing text documents.

FIG. 3B shows the document of FIG. 3A after it has been parsed.

FIG. 4 shows one embodiment of a frame for use with the sample data of FIGS. 3A and 3B.

FIG. 5 shows a sample associative memory module for the term "red" from FIG. 4 at a state where the current term being analyzed in the frame is the core term "red."

FIG. 6A shows the associative memory module for the term "red" after the system completes its analysis of the information database containing the document of FIG. 3A.

FIG. 6B shows the sample query object vector for the associative memory module of FIG. 6A.

FIG. 8B shows one sample method to generate an expanded query object vector using the filtered query object vector of FIG. 8A.

FIG. 8C shows one sample method to generate expanded associated object vectors using the filtered query object vector of FIG. 8A.

DETAILED DESCRIPTION OF CERTAIN INVENTIVE EMBODIMENTS

Figure 1:
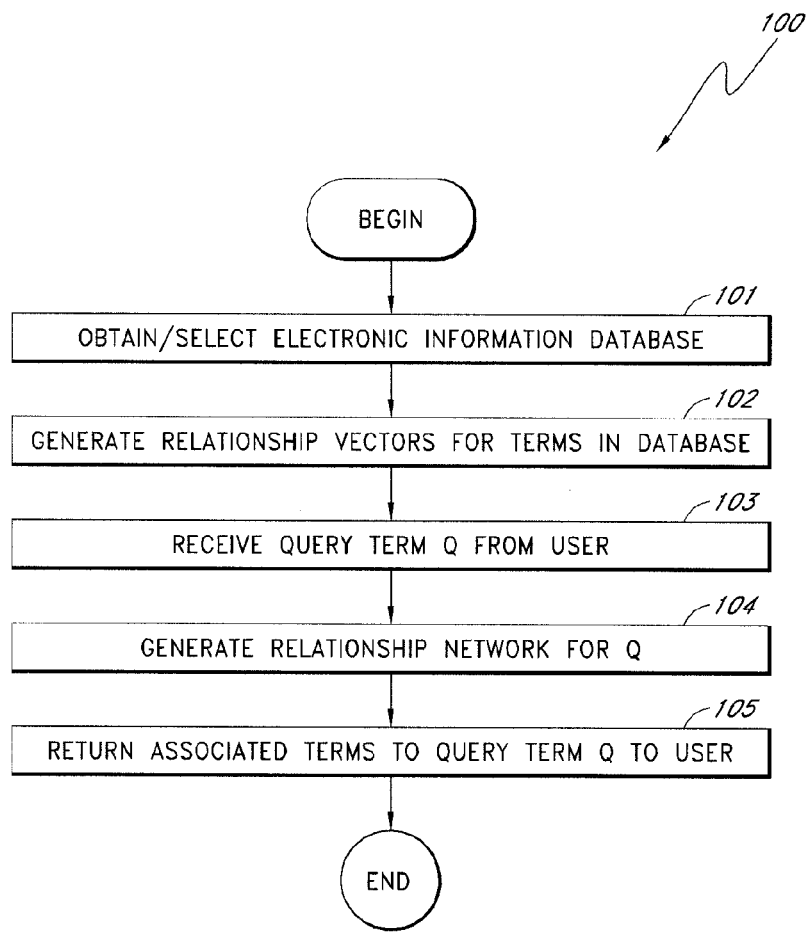
FIG. 1 is a flow chart for one embodiment of a system for generating a relationship network

One embodiment disclosed herein is a computer method and system that extracts HGLs from an electronic database. In one embodiment, a context window is defined over a portion of the electronic database to determine if the data within the context window contains an HGL. As one example, the context window may be of a size that encompasses a portion or an entire movie review, and the electronic database may be a collection of movie reviews contained on various web pages. When the system finds an HGL within the context window, that HGL is stored in an archive that may be processed as described below.

Another disclosed embodiment is a computer method and system that creates and discerns relationships between different items in a collection. In one embodiment, a many-to-many relationship is created between data items in a data set. As one example, the data items may be genes, and the data set may be the GENBANK gene database. As will be described in more detail below, embodiments of the system analyze the data items in the data set and thereafter create variable length data vectors, such as query object vectors, that reflect the relationships between the data items in the dataset. The data vectors can then be stored and used as part of data mining tool which analyzes relationships between the data items. For example, one may search for all genes in Genbank that relate to stomach cancer.

In another embodiment, the data vectors that mark associations between data items are created by first analyzing direct correlations between two data items, and then looking for further, hidden, associations between the data items. In one embodiment, these hidden relationships are determined by iteratively analyzing the distance that each term in the dataset has from other terms. Thus, for example, the more times that two words are found to be associated with one another in the data set, the closer the relationship between them is formed. In certain embodiments, terms are analyzed by moving a "frame" through each data item. For example, if the data item is a document, the frame may move through the document one line at a time, but covering three lines. As the frame moves down each line of the document, the distance between terms within the frame is analyzed. During this analysis, data vectors are created which store the relationships between each term in the frame. In one embodiment, each term within the entire dataset is represented by one vector. That vector provides the distances and relationships between that term and its related terms.

In still another embodiment a system and method of using the stored data vectors is provided to provide useful results of a search inquiry. When a person or machine inputs a term as part of a search, the data vector for that term is located, and the terms most relevant to the search term are identified from the data vector. The system then retrieves the data vectors for the most relevant terms in order to expand the search. The terms that are related to the most relevant terms can then be identified, and the process can continue to build a relationship network between the original search term, and all of its related terms. Once the queries are executed and the vectors containing the most relevant terms are scored, a relationship network is built. The resulting network of the submitted term may then be prepared for visualization for further interpretation. In one embodiment, the terms are displayed on a computer screen with a web of links showing how related each search term was to its results. To ensure that the submitted terms stay within a specific context when a relationship network is being built, a thematic context in the form of a filter can be used to control the kind of relationships extracted within the resulting network.

The systems and methods disclosed herein allow a user to interactively engage in information mining, hidden association and connection extraction, relationship network construction and comparison of objects while interactively applying thematic context controls to refine the type of relationships extracted. The systems and methods provide the user with information on how objects within the information database relate to one another, in what contexts they are related, and the strength of their relationship.

By combining an interactive role for the user, similar to what a researcher engages in during the process of experimentation, and applying it to an iterative process of automated text mining methods, certain embodiments discussed herein give the user the ability to choose the direction and define relationships as connections are made between objects of interest in the information searched. Interactively defining and extracting relationships between objects, themes and other contexts provides a valuable level of precision for relationship exploration and discovery in text.

For example, if a user was searching for Baroque compositions in an electronic information database such as the Internet, the user may submit the term "Baroque" to the relationship network system. The user may also choose to direct the search in the direction of Baroque music by using a filter term such as "compositions" in order to avoid results relating to Baroque art. The system would then not only provide information on compositions strongly associated with the term "Baroque," but also for compositions strongly associated with terms related to "Baroque," such as composer names "Bach" and "Handel," compositions involving instruments associated with Baroque music, such as "viola da gamba" or "harpsichord", or the related art period, "Classical," and so on.

In one embodiment, the relationship network system disclosed herein may be used for term disambiguation, which provides the ability to distinguish two strings of characters that are exactly the same but that have different meanings dependent upon context such as acronyms that double as identifiers or symbols or actual words. For example, the word "cleave" has two definitions that are opposite of one another.

In another embodiment, the network system disclosed herein may be used to provide search results or recommendations based on a query to an HGL network. The HGL network may be comprised of vectors containing information representing the relationships between objects in an HGL archive. A user query of the HGL network may return the most relevant related objects which may form a recommendation. For example, providing a music album as a query object may return similar music albums.

FIG. 1 shows a process 100 for generating a relationship network using an electronic information database. In certain embodiments, an electronic information database may include, but is not limited to, a collection of characters or other forms of text, images, audio, video, or any other data that may be analyzed electronically. Objects or terms within the information database may thus be documents, characters, words, images, songs, or videos ("terms").

In the embodiment illustrated, the system first selects an electronic information database to process at a state 101. In one example, the database is a database of musical compositions. The system then creates vectors for terms within the database at a state 102. The vectors are created in a way to capture the different strengths of relationships between compositions within the database. Once the vectors are created, the system receives a query "Q" from the user at a state 103. A query is undertaken, for example, when a user would like to find compositions similar to composition listed in the query Q. In certain embodiments, the system may create the vectors before receiving a query in order to reduce data processing expenditures in response to the query. In other embodiments, the vectors may be created after the query is received. Although in certain embodiments a vector is used to store relationships between terms, other data structures may be used in other embodiments. In certain embodiments using vectors, the vector space representation scheme uses variable length query object vectors. The variable length vector may have a plurality of component values or elements that are determined based on relationships between terms. In addition, the variable length vectors may be sized based on the number of associated terms within each vector.

In certain embodiments, associated terms are terms that have either a direct or indirect relationship with each other. In some embodiments, the one term is a "first" term and the second term is a "core term". In certain embodiments, a direct relationship is where a core term is found within the same frame in a vector as the associated term. In certain embodiments, an indirect relationship is where a core term and the associated term each share a common term in their respective vectors. Other relationships between terms may also be generated for use with certain embodiments discussed herein.

Returning to FIG. 1, in response to a query for term Q from a user at the state 103, the system then generates a relationship network for Q at a state 104 based on the variable length vector(s) for the term Q. In certain embodiments, a relationship network is comprised of a network of relationship vectors whose connections to each other, and the strength of those connections, are based on shared unique attributes within a defined context and theme. Contexts and themes are discussed more specifically below. Once the relationship network has been generated at the state 104, the system may then return terms that are associated with Q at a state 105. For example, the returned terms may point to compositions that are by the same composer as Q, compositions related to Q, or recommendations based on Q.

1. GENERATING VECTORS FOR A RELATIONSHIP NETWORK

Figure 2A:
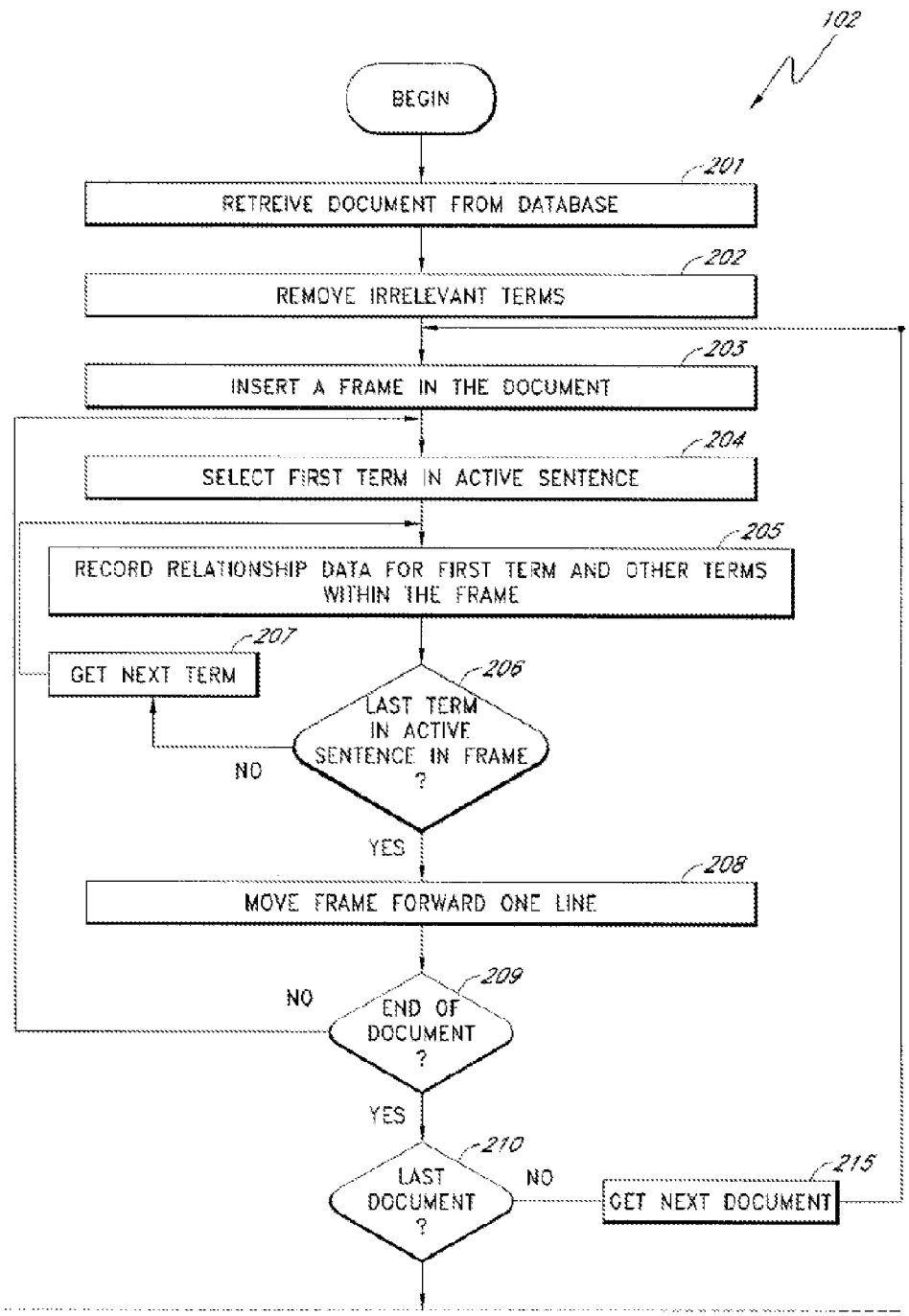
FIG. 2 is a flow chart for one embodiment of a system for generating vectors for use with a relationship network based on an electronic information database containing text documents.
Figure 2B:
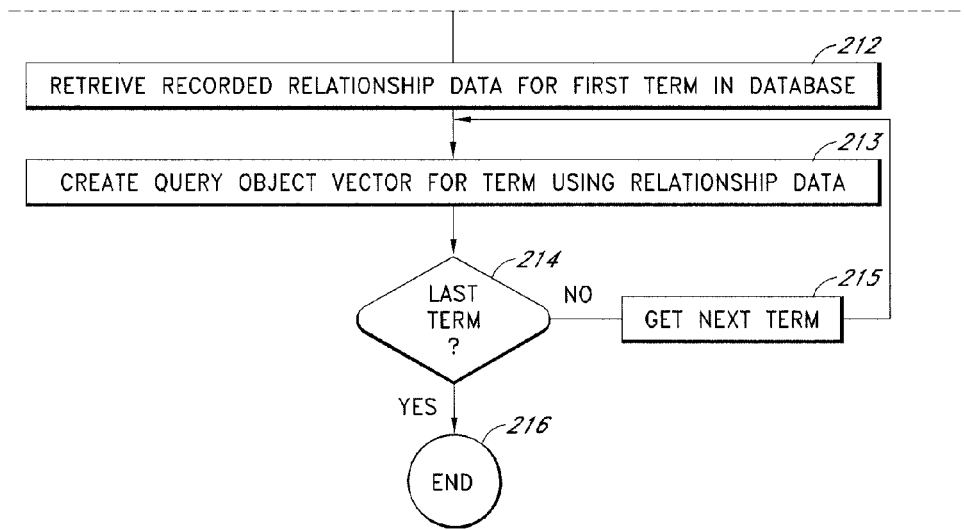

FIG. 2 is a flow chart for one embodiment of the process 102 of generating variable length vectors from data stored within a database. The process 102 gathers each document in the database at a state 201. For each document that is gathered, the document is parsed at a state 202 in order to remove irrelevant or low value data, such as stop-words (common words such as a, of, as, the, on, etc.). After each document has been parsed at the state 202, the information database contains only valuable terms.

Then, for each parsed document, the system inserts a frame at a state 203 in the document. The frame can be thought of as an overlay that covers one or more lines of text in the documents. For example, the frame may cover three lines or sentences in the document. Once the frame has been inserted at the state 203, the process 102 moves to a state 204 wherein the first term in the first line processed in the frame is selected. FIG. 4 shows one embodiment of a frame 400 for use with the sample data illustrated in FIGS. 3A and 3B. After the first term in the active sentence of the frame is selected at the state 204, a set of relationship data is generated between the first term ("core term") and the other terms within the frame ("associated terms") at a state 205. The system records the relationship data for the core term, which includes data such as a calculated distance score for each core term from the first term. In certain embodiments, the relationship data may be stored in an associative memory module, as shown in FIG. 5. Once the relationship data has been generated for the first term, the process 102 moves to a decision state 206 wherein a determination is made whether the last term in the active sentence of the frame is being analyzed. If the current term is not the last term, then the process 102 moves to a state 207 wherein the next term within the frame is captured. The process 102 then returns to the state 205 to calculate the relationship data between the newly captured term and the other core terms within the frame at the state 205. If the term being processed is the last term in the active sentence of the frame, then the process 102 moves to a state 208 wherein the frame is moved ahead by one sentence or line in the document under analysis. If the term is not the last term in the active sentence for the frame, the process 102 moves back to state 205.

Once the process 102 has moved the frame ahead by another line or sentence, a determination is made whether or not the frame is at the end of the document at a decision state 209. If a determination is made that the process 102 is not at the end of the document, then the process 102 returns to the state 204 wherein the first term within the active sentence of the moved frame is selected. If a determination is made that the frame is at the end of the document, then the process 102 moves to a decision state 210 where a determination is made whether or not the process is at the last document in the database. If the process 102 is not at the last document in the database, then the process 102 moves to a state 211 wherein the next document within the database is selected. The process 102 then returns to the state 203 wherein a frame is inserted into the newly gathered document.

If a determination is made at the decision state 210 that the process 102 is at the last document, then the process moves to state 212 where it retrieves the recorded relationship data, such as from the associative memory module, for the first term in the database. Then the process moves to state 213 where a variable length query object vector is created using the relationship data from state 212. In certain embodiments, the relationship data values from state 212, which may be stored in a query object vector, may be enhanced when stored in the query object vector. Examples of enhancing the relationship data values include increasing the data values of unique associations and decreasing the data values for common associations. FIG. 6B shows the sample query object vector for the associative memory module of FIG. 6A. Next, the process moves to decision state 214 then checks to determine if the term analyzed is the last term in the database. If it is not the last term analyzed, the process moves to state 215 wherein the next term within the database is selected. The process 102 then returns to the state 213 wherein a query object vector for the next term is created. If a determination is made at the decision state 214 that the process 102 is at the last term, then the process terminates at the end state 216.

FIG. 3A shows a sample document 300 from an information database containing text documents. FIG. 3B shows the stored data from the document of FIG. 3A after it has been parsed 310. As it can be seen from the differences between FIGS. 3A and 3B, in this embodiment the system removed stop-words such as "they" 301 "from" 302 "until" 303 and "they're" 304 and also organized each sentence according to the identification of the document 311 it was found in and its terms 312.

As shown in FIG. 4, one embodiment of the context or frame 400 consists of associated terms surrounding and ultimately associated with the current, core term being analyzed in the frame, "red" 412. In one embodiment, the frame 400 and the space it encompasses are constructed by using distance thresholds within documents. For example, in FIG. 4, the distance threshold is one sentence before and one sentence after the sentence containing the core term being analyzed 410. If a term is within the distance threshold, it is considered an associated term and it becomes part of the context frame 400. On the other hand, if a term is outside the distance threshold, it will not become part of the context frame 400 and does not receive a distance score (also referred to as a score association) to the core term. Using the number of words in a document as well as number of sentences, paragraphs, characters or other objects, distance thresholds can be calculated and the size of the framed context 400 will grow and fluctuate as documents are read in and new statistical data is gathered. In one embodiment, wherein the digital content to be analyzed is raw text documents, the frame 400 is set to three, four or five sentences per frame. The example in FIG. 4 has a three sentence context frame 400.

The system may move the frame 400 through the documents or other parsed data which comprise the information database. As the frame is moved line by line through a set of documents, terms can be automatically associated with one another including an identifier representing the operative document 311. As terms flow in and out of the frame that moves through the documents, associated terms can define their strength of association to the core term by distance scores. For example, in FIG. 4, after the system has calculated the distance scores for the core term "red," the focus of the frame will move to the next term, "pink," until the focus reaches the final term in the middle line of the frame, "raspberry." After the system has calculated the distance scores for terms associated with the term "raspberry", the frame will advance by one line and the core term focus will begin with the first term on the next line, "Hummingbirds." Furthermore, the sentence beginning with the term "bloom" will flow out of the frame and the sentence beginning with the term "one" will flow into the frame.

By giving a distance score to each associated term, each core term 410 in the document becomes a statistically important object containing a family of relationship scored associative terms as elements of its associative memory module. The distance score between two terms may then be used to create a relationship score between two terms after the process completes analysis of the entire information database. For example, in one embodiment, distance scores between two terms as they appear repeatedly within a frame throughout the information database may be summed to create a relationship score.

Frame 400 usage in single documents becomes especially advantageous when relationship scores are generated over thousands or millions of documents. In certain embodiments herein, significant relationships between words are defined over time by strong and unique connections between two or more terms. Relationship scores to a term can be compared to the way a person might learn by repetition. A person will tend to remember and associate two terms together if he hears them together on a repeated basis, whereas a person may not remember or associate two terms together if he does not hear them together very often. In certain embodiments discussed herein, the system gives a high relationship score to two or more terms which appear often together. In certain other embodiments, two or more terms sharing a very unique set of attributes are scored highly.

As discussed above, the system may store relationships between a core term 410 and its associated term in file called an associative memory module that is created for the core term. In one embodiment, an associative memory module is a database schema storing information related to statistical and distance-based object associations, as well as document statistics. The associative memory module may thus advantageously capture meaning sensitivity in the data to be searched, which requires that the closeness of every pair of terms be known, scored for distance and stored. Thus, associative memory modules may advantageously store information such as words, paragraphs, search queries, objects, documents, document identifiers, parts of images, parts of terms, parts of text, parts of sequences or any piece of an object that has been split into parts, terms and documents, and many other types of information items similarly represented, such as numerical, financial, and scientific data. In one embodiment, every associated term in an associative memory module and vector is also the core term of its own associative memory module and vector, thereby enabling a high dimension many-to-many scored associative relationship network. In certain embodiments, this in turn enables strong comparison to occur between, for example, parts of terms, between terms, and terms and the documents they appear in.

In certain embodiments, the length of associative memory modules and vectors may be limited in order to facilitate faster creation of the relationship network or due memory storage constraints since the length of the vector or module may affect the size of the database and the system's performance capabilities. In other embodiments, an associative memory module or vector may contain as many elements as may be supported. In certain embodiments, the system may present a certain number of terms with a high score, or terms with a score above a certain threshold value in order to best represent the information database queried and to facilitate viewing by a user.

FIG. 5 shows a sample associative memory module for the term "red" 500 from FIG. 4 at a state where the current term being analyzed in the frame 400 is the core term "red" 410. The associative memory module 500 shown has three sections: statistics related to the term 510, statistics related to documents containing the term 520, and statistics related to associated terms 530. In the embodiment displayed, the first section, statistics related to the term 510, may contain information such as the number of occurrences of the term in the text analyzed 511, the number of sentences that contain the term 512, the number of other terms associated with the core term 513, and the number of associations between other terms with the core term 514. Since the associative memory module 500 displayed only contains data through analysis of the term "red" 410 in the first document analyzed in the database (FIG. 3A), the data in FIG. 5 reflects the incomplete analysis. Thus, since the term "red" 410 has occurred only once so far, and in only one sentence 412, the number of occurrences 510 and number of sentences 511 for the term "red" 410 both equal one. Similarly, since all eighteen of the terms analyzed so far are also all of the terms currently in the frame 400, they are all associated 513 with the term "red" 410. Furthermore, since none of these associated terms have yet appeared twice, they are all eighteen individual associations 514 for the term "red" 410.

The document statistics section 520 advantageously identifies documents 521 that contain the term, the number of sentences in the document that contain the term 522, and a score for the document in relation to the term 523. In the sample shown, only one document 524 is listed because it is the only document analyzed that contains the term "red". The document 524 is identified by its title, although any other well known identification system may be used to record document identifications, such as a uniform resource locator ("URL") address. Furthermore, only one sentence 525 that contains the term "red" has been found in the document. Consequently, a score 526 of one has been assigned to that document. In the embodiment shown, the score 526 associated with a document is the number of appearances of the term within the document, although in other embodiments other scoring methods may be used.

The associated terms section 530 includes, but is not limited to, data such associated terms 531, the number of occurrences of each associated term in relation to the core term 532 and the corresponding distance score for the associated term/core term pair 533. In other embodiments, the associated terms section 530 may also include data on the number of sentences processed so far that contain the associated term in relation to the core term and the distance of the associated term to the core term.

Distance scores 533 to measure associations between terms are applied within the moving frame. For example, FIG. 4 shows a three sentence frame 400 surrounding the core term, "red". As the frame 400 and its core term focus 410 moves through the document a calculation is applied to assign distance scores to each term within the frame 400 in relation to the core term 410.

A distance score 533 may be calculated by any number of well known methods. Furthermore, in order to give greater value to associated terms in closer proximity to a core term, the distance score values 533 assigned to associated terms as their distance to the core term increases may advantageously be decayed. This may advantageously be applied using the Fibonacci sequence in reverse. In other words, in one embodiment using the Fibonacci sequence in reverse, the distance score from the core term to an associated term is:

$$S_{ij} = \phi^{\Delta x},$$
where:
$S_{ij}$ = distance score between core term i and associated term j,
$\phi$ = 0.618 is the Golden Ratio component "phi"[†], and
$\Delta x = |x_i - x_j|$ is the relative position between core term i and associated term j.
[†] $\phi$ is the decimal component of the Golden Ratio. $\phi$ = 1.618034.

Returning to FIG. 5, the distance score 536 using this equation for the associated term "cardinal" to the term "red," which are neighboring terms ($\Delta x=1$), is $0.618=0.618^1$. Similarly, the distance score 537 for the associated term "bloom" to the term "red" is $0.008=0.618^{10}$, since "bloom" is ten terms away from "red" ($\Delta x=10$). In certain embodiments, as the system encounters a second occurrence between an associated term and a core term separate from the first occurrence, then the system may add the distance score of the second occurrence to the first occurrence in order to keep a running total of the distance score for the association. For example, in FIG. 5, if the system encounters the term "cardinal" 534 again within a frame containing "red", and the distance score for the second occurrence is 0.008, then the system may update the distance score 536 for "cardinal" in the "red" associative memory module 500 to be 0.626=0.618+0.008. In other embodiments, other methods may be used to update a distance score value as the system processes an information database.

Calculations based on Fibonacci's number may be advantageously used because sequences based on the ratio of successive Fibonacci numbers, the Golden Ratio, are found in many natural phenomena, including biology and materials science. Fibonacci's number may thus have a relationship to grammar and human generated patterns and an effect on the interpretation of information.

In another embodiment, the Enhanced Exponentially Weighted Moving Average (EEMA), a variation of the EWMA (Exponentially Weighted Moving Average) time series calculation, may be used to compute distance scores between terms within a frame. A sample equation using the EEMA may be defined as:

$$EEMA = 1/((K*(C-P)+P)$$

Where:
C=Position of the core term
P=Previous period's Simple Moving Average (SMA)
N=Number of periods for EEMA
$K = e^{(-C/5.0)}$ Smoothing constant In yet another embodiment, a standard exponential decay algorithm can be applied. Below are two equations for exponential decay that can be used to calculate distance scores:
If core term i comes before associated term j, then $$Sij = 1/e(j-i)$$

If core term i comes after associated term j, then $$Sij = 1/e(i-j)$$

where Sij=relationship score between object i and j,

FIG. 6A shows the associative memory module 600 for the term "red" after the system completes analysis of the information database containing the document of FIG. 3A. In the sample associative memory module 600, the system has determined that the information database analyzed contains twelve occurrences 611 of the term "red" in a total of twelve sentences 612. Furthermore, there are 319 terms associated with "red" and 450 associations between those terms and "red". Whereas the document "Gardening Journal" 625 contained four sentences 626 totaling four occurrences of "red", the document "Top News Stories" 628 only contained one sentence with one occurrence 630. Additionally, while the associated term "cardinal" 634 had six associations with red for whose individual distance scores summed to equal a total distance score 636 of 4.124, the associated term "paste" 637 only had one associated occurrence with "red" for a total distance score of 0.008.

After the system processes each document in the information database, each associative memory module may be used to create a query object vector. FIG. 6B shows a sample query object vector 650 created from the associative memory module 600 of FIG. 6A. In the embodiment shown, the distance score 633 from the associative memory module 650 is used to calculate the relationship score 653 for the query object vector 650 by emphasizing common associations, as will be discussed in further detail below. The system then ranks the associated terms in the query object vector 650 according to their relationship scores 653. For example, in FIG. 6B, the associated term "Cardinal" 654 is ranked first because it has the highest relationship score and the term "Paste" 655 is ranked at 319, which equals the total number of terms associated with "red," because it has the lowest relationship score. Each associative memory module is thus used to create a query object vector 213.

FIG. 6B thus illustrates one advantage of the systems and methods described herein. In keyword based searches, if a user looking for red sweaters used the term "red" in her query, then she would only receive results where the sweaters were specifically listed with the term "red." On the other hand, if the user submitted the search to an embodiment of the system described herein, the user would not only receive results for "red" sweaters, but for sweaters with other shades of red, such as cardinal, maroon and raspberry.

In certain embodiments, the system may advantageously use data from an associative memory module in order to create a different relationship score values for a query object vector. For example, in one embodiment, the distance score may be modified with the aim of emphasizing unique associations, such as to help in finding hidden relationships. Hidden relationships may be used to assist in hypothesis formulations by presenting a list of possibly important new relationships unknown to the user. In one embodiment, the following uniqueness function may be used to calculate a relationship score emphasizing uniqueness:

$$U_{ij} = S_{ij} \cdot B_{ij}$$
where:
$S_{ij}$ = Distance-based relationship score between term i and j
$B_{ij}$ = Bias for term i of association with term j,
where:
$B_{ij} = A_i/A_j$
$A_i$ = Total number of associations of term i
$A_j$ = Total number of associations of term j In another embodiment, the distance score may be modified with the aim of emphasizing common associations such as to generate a clear definition based on direct associations. Direct associations can be used to generate a list of very similar objects. In one embodiment, the following commonality function may be used to calculate a relationship score emphasizing commonly associated terms:

$$B_{ij} = A_j/A_i$$
where:
$A_i$ = Total number of associations of term i
$A_j$ = Total number of associations of term j Thus, by the time the process of FIG. 2 completes, each term in each parsed document will have its own query object vector; i.e., each term will be a core term for a query object vector and an associated term for other term's query object vectors. In certain embodiments, each query object vector may either emphasize unique or common relationships. Furthermore, in certain embodiments, each document will also have its own associate memory module and query object vector. These vectors may then be used to build a relationship network.

2. BUILDING A RELATIONSHIP NETWORK

Figure 7:
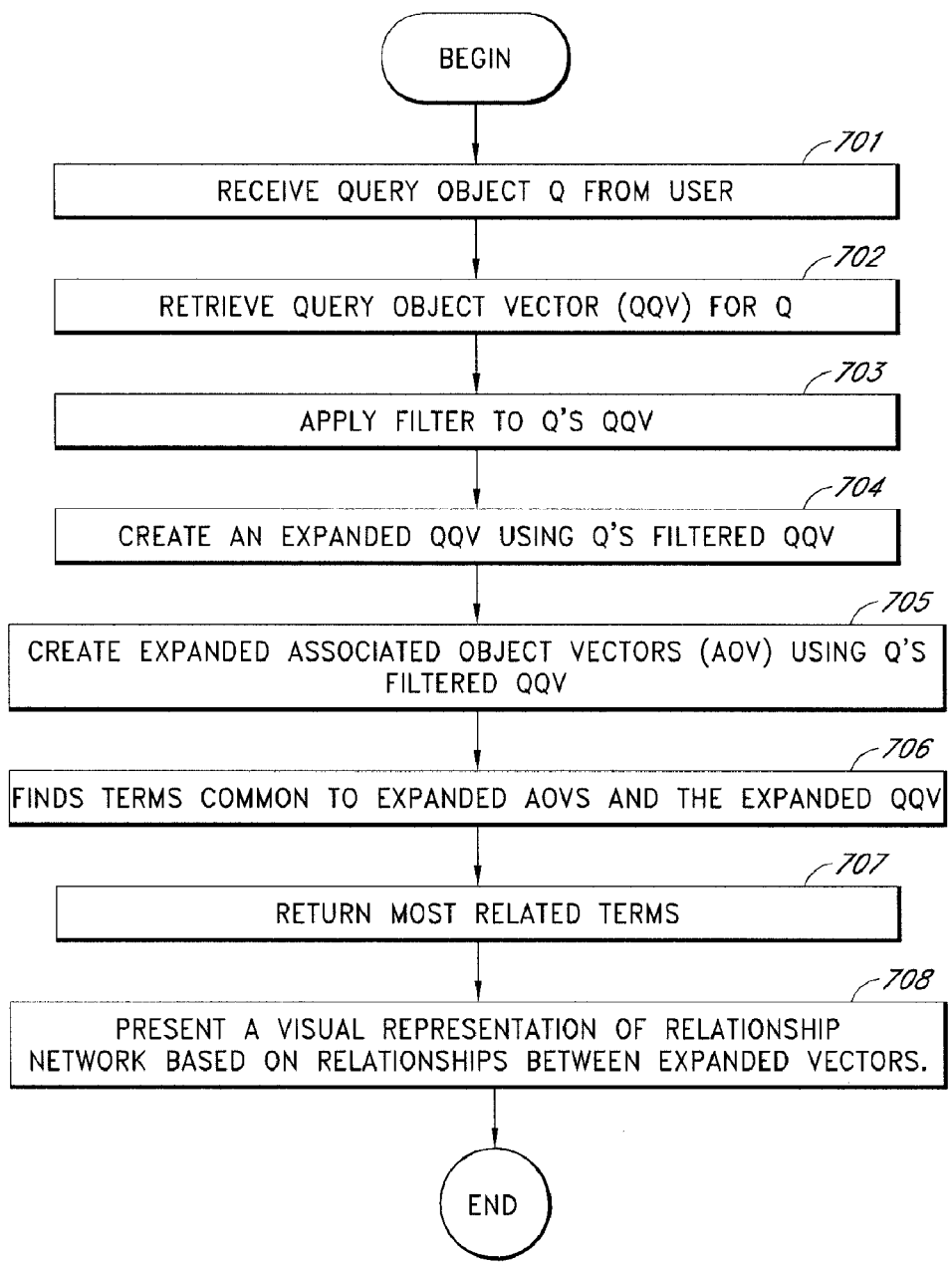
FIG. 7 shows a sample flow chart for a network generation engine.

FIG. 7 shows a process 700 for a network generation engine for use with embodiments of the relationship network discussed above. Specifically, disclosed is one embodiment for generating a relationship network using the query object vectors generated from an electronic information database containing text documents as described above. In response to a search query term inputted by a user, a relationship network may be generated from the extraction of relationships from query object vectors based upon the search query term. In certain embodiments, the relationship network would be comprised of a network of expanded vectors of terms, their connections to each other and the strength of these connections, where the connections are based on shared attributes within a defined frame. Although the sample flow chart illustrated discusses an embodiment using text documents and terms, in other embodiments, the query term may be audio data, video data, image data, or any other kind of electronic data.

First, a user submits at least one query term, Q, to the system at a state 701. In certain embodiments, multiple terms may be submitted to the system, and may be treated as one query term or a multiple of query terms. In certain embodiments, if Q does not exist in the information database, then the system does not return any data. In response to receiving the query, the system retrieves the vector for the query term, the query object vector ("QOV") at a state 702. The process 700 then moves to a state 703 wherein the user or system configures a filter for use with the query in order to focus the query results. This filter may be set, by for example, filtering terms out of the vector retrieved for the search term Q at the state 703. This will be discussed in further detail below with reference to FIG. 8A. Next, the system expands the vector into an expanded QOV at a state 704. This process will be discussed in further detail below with reference to FIG. 8B. The process 700 then moves to a state 705 wherein the system uses the QOV to generate expanded associated object vectors ("AOV"). This will be discussed in further detail below with reference to FIG. 8C. The system then moves to a state 706 to find associated terms between the expanded AOVs and the expanded QOV. Search results for the query Q are then provided at a state 707. The process of providing search results will be discussed below with reference to FIG. 8D. Finally, the process 700 presents a visual representation of the relationship network based on the query results.

In one embodiment, the system uses filters, such as forms of ontology of related themes and categories, to control the kind of relationships derived during the search process and to ensure that terms stay within a certain defined context when the relationship network is being built. In certain embodiments, filters may be employed because the terms selected for the filter also exist in the information database being searched, so the filter terms thus have vectors of their own. The filter may be supplied along with the query in order to focus the query results. The filter can be a list of words, symbols or objects by which the results of a query are controlled. For example, the filter phrase "genes and inferred relationships to drugs" may be used for a genomic search done on an information database related to genetic data.

In certain embodiments, the filter may be a complete vector wherein its elements represent the entire set of frame data or context in a database of documents to control the relationship extraction process. Any search results that are found to intersect with the vector-filter will be processed according to the type of filter used.

Figure 8A:
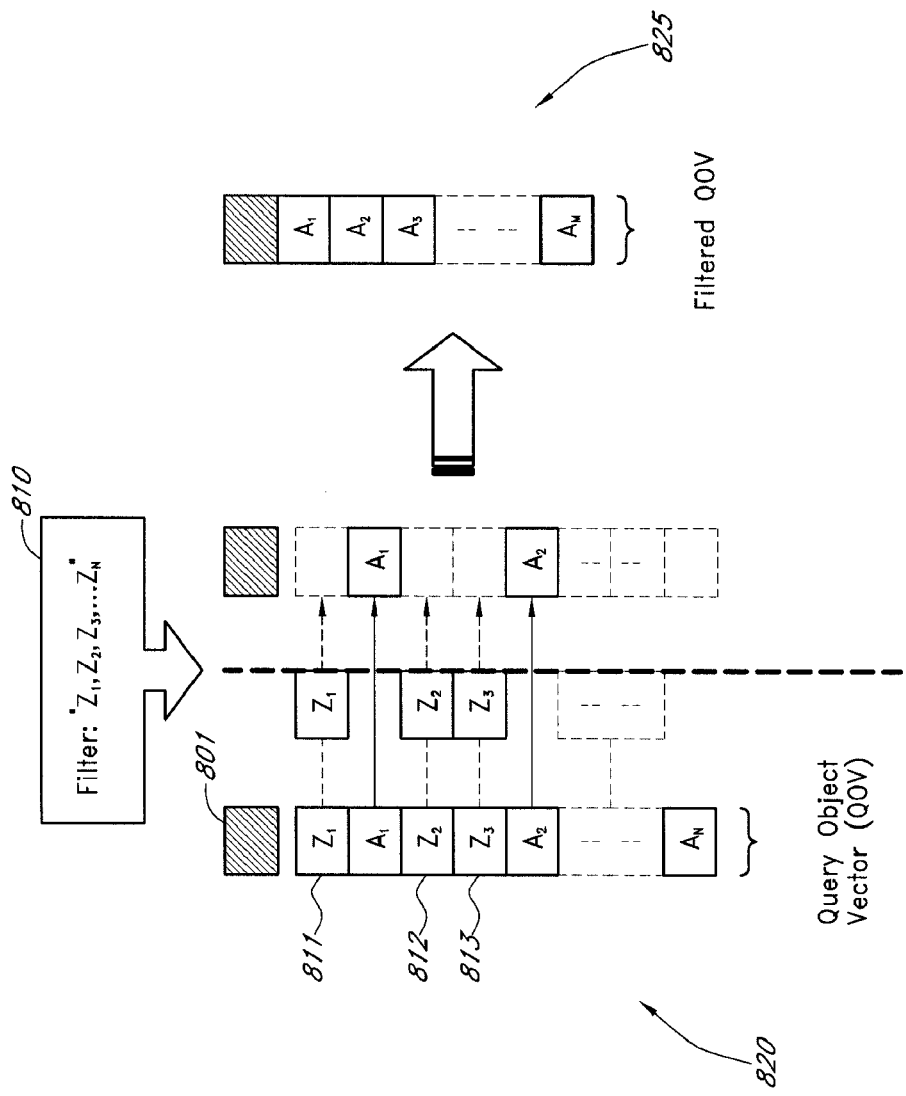
FIG. 8A shows a sample exclusion filter vector applied to a query object vector

Many different kinds of filters may be enlisted for use with the systems and methods disclosed herein. One type of filter, an exclusion filter, can actively remove terms and vectors which do not match the filter. Exclusion filters may be used to assure that elements from a specific theme are removed from the query object vectors and associated object vectors for any aspect of the process. FIG. 8A shows a sample exclusion filter vector 810 containing the terms $Z_1$ to $Z_n$. The filter vector is applied to the query object vector 820 retrieved for query Q 801 in order to focus the results of the query. As shown in FIG. 8A, the system advantageously removes instances of terms that appear in the filter vector. The terms $Z_1$, $Z_2$, and $Z_3$ have been filtered from the final query object vector 825 because those terms appear in the exclusion filter 810.

On the other hand, a selection filter can actively select terms and vectors which match the filter. Selection filters may be used to assure that only elements from a specific theme are used for a specific process. In one embodiment, the process includes the selection of top query term vector elements and associated term vector elements for generation of expanded query term vectors and associated term vectors. Filter elements also effect the selection of final terms being used in the expanded query term vector to expanded associated comparison and association score calculation.

Another type of filter, a weighting filter, may adjust the relationship scores of certain terms and vectors in order cause the terms or vectors to be reordered. Weighing filters may be used to alter the weight of a specific group of terms, thereby affecting their impact on the algorithm process and calculation results.

Filters may advantageously be applied during any point wherein the system is expanding the query object vector retrieved in response to a query. The use of filters results in the ability of the system to base relationships on specific sets of terms which may comprise a theme. Without theme filtering, the system might retrieve inferred relationships of all kinds which may not be beneficial if it is not known what kind of relationships to look for. For example, a user submitting the search query term "red" to an information database without a filter might receive very broad results. On the other hand, if the user employs a selection filter, which would exclude all terms not found in the filter, such as the filter phrase or vector "flowers" as a context for "red," specific terms relating to red colored flora will most likely be found in the query results. In certain embodiments, filters may be predefined and interchangeable in order to allow a user to tailor a search query. Creating a network of term relationships with this kind of context control allows for previously unidentified connections to be brought to the fore as a user of the system might desire to find what relationships to this query term exist in a specified context.

FIG. 8B is a data flow diagram that shows one exemplary method of generating an expanded QOV 850 using the filtered QOV 825 of FIG. 8A. First, the system identifies the thirty strongest terms, $A_1$ to $A_{30}$ 826, related to the query term Q 801. These thirty strongest terms are added to the beginning 826 of the expanded QOV 850. Next, the system retrieves the vectors for each of those thirty terms, $A_1$ to $A_{30}$ 830, and inserts the top three strongest terms in each of those thirty vectors 831 (i.e., $A_{1,1}$ to $A_{1,3}$ for $A_1$, $A_{2,1}$ to $A_{2,3}$ for $A_2$, ... $A_{10,1}$ to $A_{10,3}$ for $A_{10}$) to complete the expanded QOV 850. Although the embodiment of the system shown selects thirty terms for processing, in other embodiments, any other number of terms may be used for processing.

FIG. 8C is a data flow diagram showing one method of generating an expanded AOV 875 using the filtered QOV 825 of FIG. 8A. First, the system identifies the thirty strongest terms, $A_1$ to $A_{30}$ 826, related to Q 801, retrieves their vectors 827, and begins an expanded AOV 875 for each term $A_1$ to $A_{30}$. Then the system identifies the three strongest terms from the first dimension vectors related to each of $A_1$ to $A_{30}$, (i.e., $A_{1,1}$ to $A_{1,3}$ for $A_1$, $A_{2,1}$ to $A_{2,3}$ for $A_2$, ... $A_{30,1}$ to $A_{30,3}$ for $A_{30}$) 830, adds those associated terms to the corresponding expanded AOV 875, $A_1$ to $A_{30}$, and retrieves their vectors 831. Similarly, the system retrieves the three strongest terms from the second dimension vectors related to each $A_{1,1}$ to $A_{30,3}$, (i.e., $A_{1,1,1}$ to $A_{1,1,3}$ for $A_{1,1}$, $A_{1,2,1}$ to $A_{1,2,3}$ for $A_{1,2}$, ... $A_{30,3,1}$ to $A_{30,3,3}$ for $A_{30,3}$) 840 and retrieves their vectors 841. Once more, the system retrieves the three strongest terms from the third dimension related to each $A_{1,1,1}$ to $A_{30,3,3}$ (i.e., $A_{1,1,1,1}$ to $A_{1,1,1,3}$ for $A_{1,1}$, $A_{1,1,2,1}$ to $A_{1,1,2,3}$ for $A_{1,2}$, ... $A_{30,3,3,1}$ to $A_{30,3,3,3}$ for $A_{30,3,3}$) 850. The top three associated terms from the third dimension vectors 850 are then inserted after the first dimension terms 830 already in the expanded AOV 875 to complete the expanded AOV 875. Although FIG. 8C shows the generation of an expanded AOV 875 for $A_1$, in the embodiment shown the process produces a total of 30 expanded AOVs for each $A_1$ to $A_{30}$ 826.

Figure 8D:
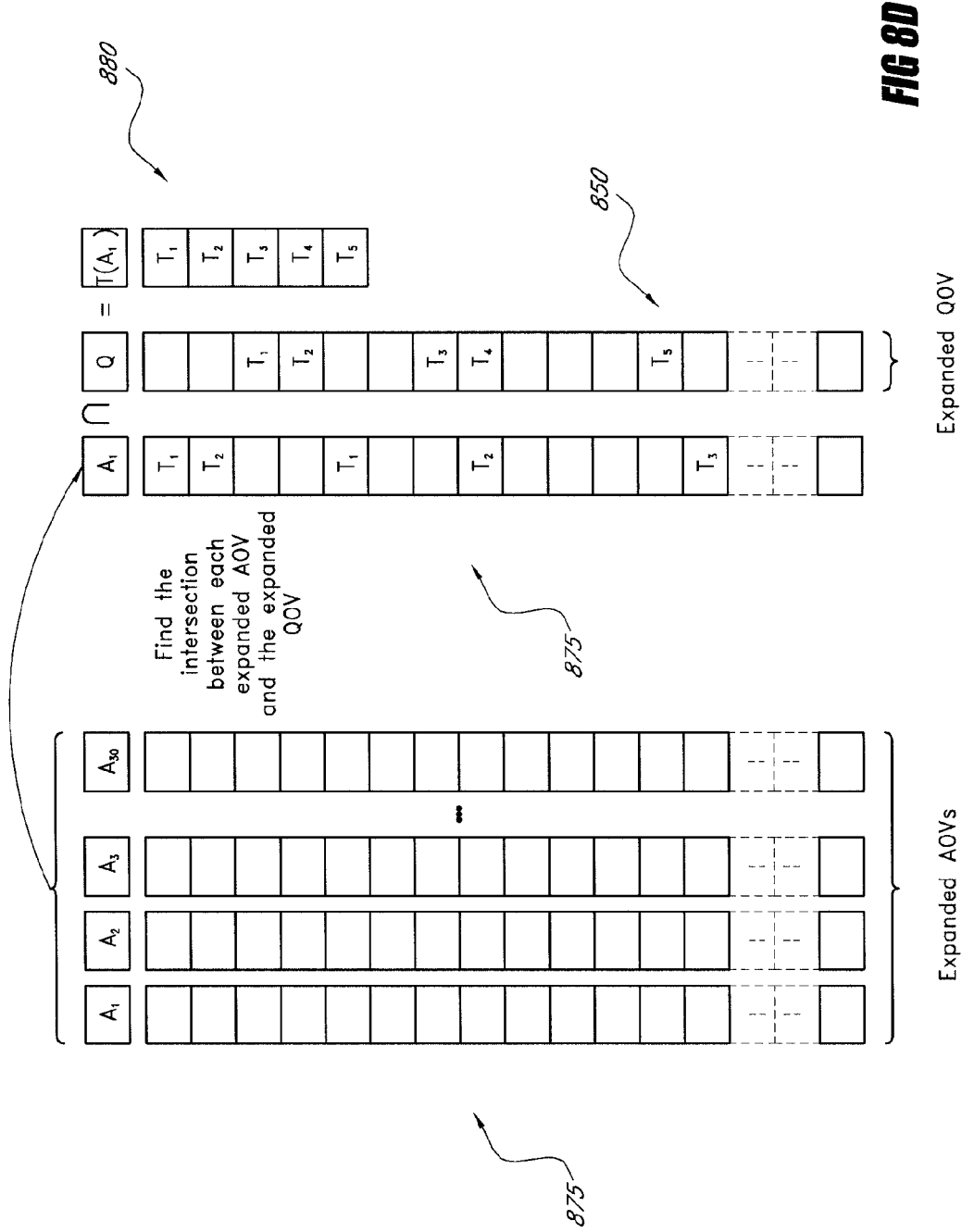
FIG. 8D shows one sample method to use expanded associated object vectors with an expanded query object vector to find associated terms between the associated object vectors and the expanded query object vector in order to produce search results for a query.

FIG. 8D is a data flow diagram that shows one exemplary method of using expanded AOVs 875 with an expanded QOV 850 to find associated terms between the AOVs 875 and the expanded QOV 850 in order to produce search results for the query Q 801. The expanded vectors 850 and 875 are passed to a function that determines similarity between intersecting terms in the expanded vectors 850 and 875. In one embodiment, as illustrated in FIG. 8D, the system may take the intersection of each expanded AOVs 875 and the QOV 850 in order to locate associated terms 880 for query term Q 801. In other embodiments, other functions may be used to locate associated terms.

In certain embodiments, a similarity score between the query term Q and each associated term may be calculated after associated terms for Q are located. The associated terms may then be ranked by their similarity score values, so that the associated term with the highest similarity score is ranked first. In certain embodiments, the similarity score function may be a correlation coefficient distance measurement and its value can be assigned to the resulting matching terms as a score signifying a final similarity measurement between the associated term and the initial query term, i.e., how much the results match the initial query term.

In one embodiment, the similarity score between two vectors may be calculated by taking the sum of the relationship scores from the intersecting terms and multiplying it by the length of the vector composed only of the intersecting terms. In another embodiment, the similarity score between two vectors may be a correlation coefficient distance measurement function which uses the following equations:

$$n\left(\sum_{i=1}^{n} (V \cap W)_k\right) \text{ or } \|X\| \sum_{i=1}^{n} X_k$$

where $$X = (V \cap W)_x$$

V = query vector, and
W = any vector compared to the query vector.

In another embodiment, an uncentered Pearson correlation coefficient distance measurement may be used to calculate the similarity score between vectors of different sizes, wherein:

$$r_U = \frac{1}{n} \sum_{i=1}^{n} \left(\frac{x_i}{\sigma_x^{(0)}}\right)\left(\frac{y_i}{\sigma_y^{(0)}}\right)$$

where $$\sigma_x^{(0)} = \sqrt{\frac{1}{n}\sum_{i=1}^{n} x_i^2}$$

and wherein distance is defined by $$d_u \equiv 1 - r_U$$

In certain embodiments, after the query result terms 880 are located, the vectors of each element returned for the query also extracted and compared and scored for similarity. This step advantageously allows for the results to be networked by intersecting the contents of their vectors. The network created by the intersection may be used to determine how the initial query results are related, in what context they relate, whether their connection is direct or indirect, and the strength of their relationships.

Figure 9:
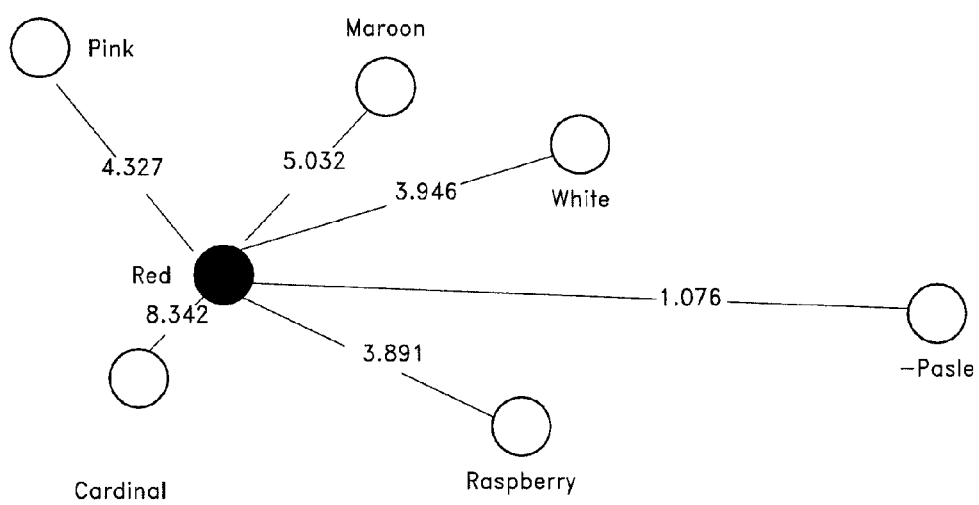
FIG. 9 shows a graph visualization for a relationship network created in response to a query for the term "red.".

The query result data and the relationship network built using that data may thus advantageously show the relationship of the query term 801 to other terms, the relationship of vectors to one another, and the strength of their relationships using a similarity score. In certain embodiments, the resulting relationship network of the query result terms 880 and/or query-related vectors can be visualized if necessary for further interpretation. For example, FIG. 9 shows a graph visualization 900 (not drawn to scale) for a relationship network created in response to a query for the term "red." Terms that have a higher relationship score to the term "red" appear closer to "red," such as "cardinal" 654. Terms with a lower relationship score appear farther away, such as "paste" 655. A user may advantageously use a visualization similar to FIG. 9 in order to quickly understand the relationship between terms in the information database.

3. EXAMPLE SYSTEM COMPONENTS

Figure 10A:
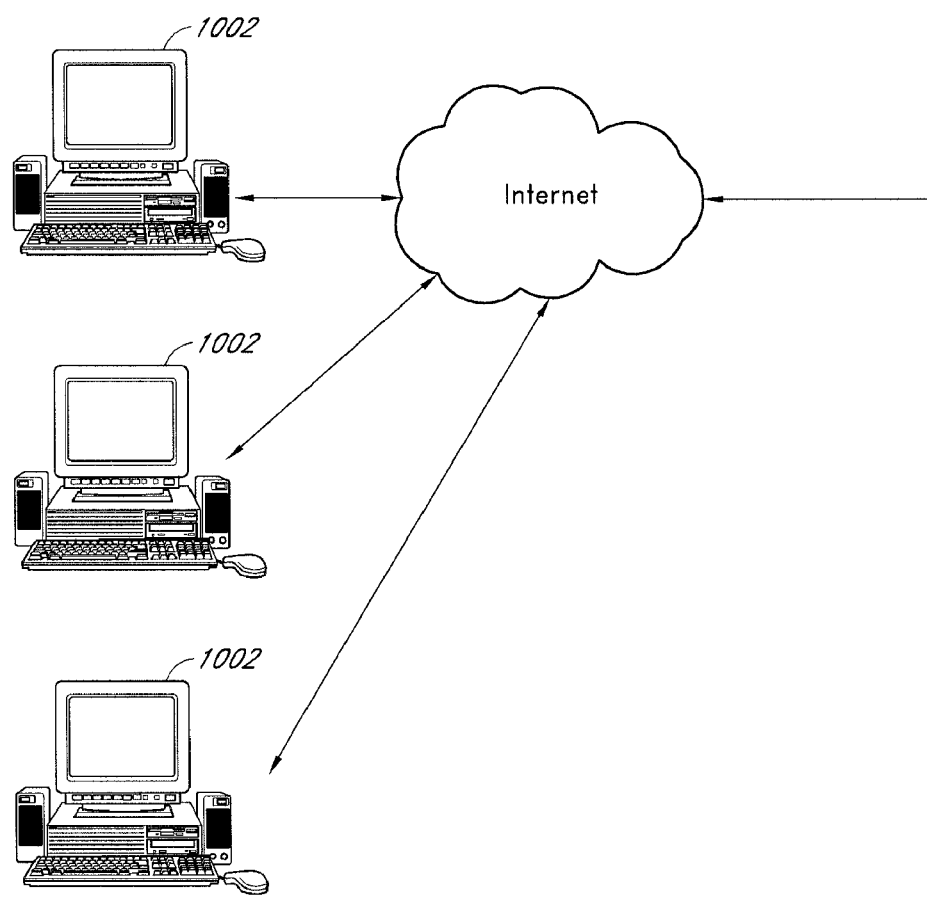
FIG. 10 illustrates a relationship network system according to one embodiment.
Figure 10:
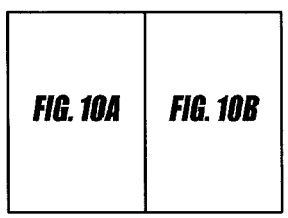
Figure 10B:
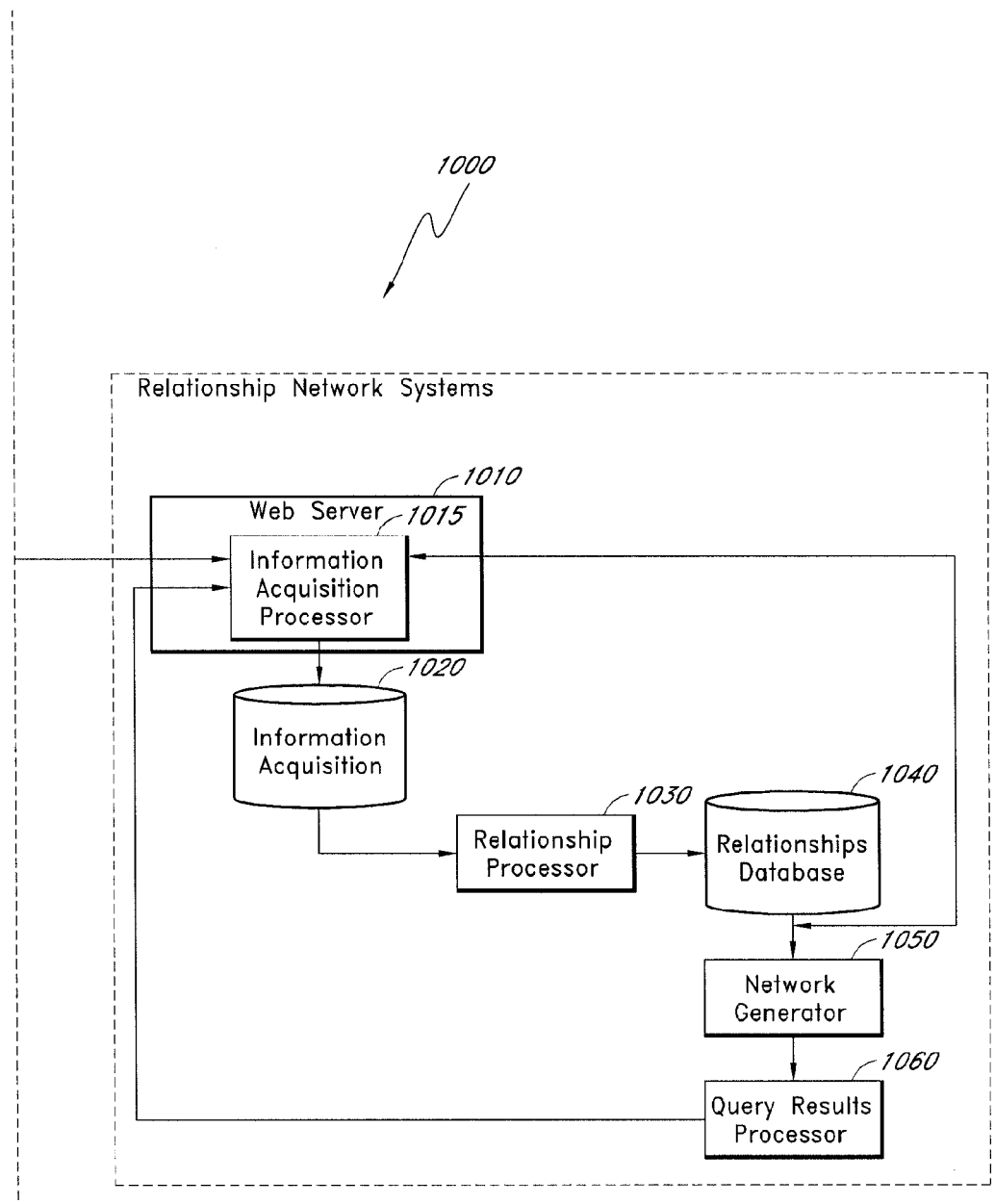

FIG. 10 illustrates a relationship network system 1000 according to one embodiment. The relationship network system 1000 includes a web server 1010 that generates and serves pages of a host web site to computing devices 1002 of end users. Although depicted as desktop computers 1002, the computing devices 1002 may include a variety of other types of devices, such as cellular telephones and Personal Digital Assistants (PDA). The web server 1010 may be implemented as a single physical server or a collection of physical servers. Certain embodiments may alternatively be embodied in another type of multi-user, interactive system, such as an interactive television system, an online services network, or a telephone-based system in which users select items to acquire via telephone keypad entries and/or voice.

The web server 1010 provides user access to electronic information represented within a database or a collection of databases 1020. An information acquisition processor 1015 that runs on, or in association with, the web server provides functionality for users to enter a search query for information they would like to find. In one embodiment, the information represented in the database 1020 may include documents, characters, words, images, songs, or videos or any other data that may be stored electronically. Many hundreds of thousands or millions of bytes of data may be stored in the database.

In one embodiment, a document or other object in the information database 1020 may be retrieved using the information acquisition processor 1015. Each object may be located by, for example, conducting a search for the item via the information acquisition processor 1015, or by selecting the object from a browse tree listing.

As illustrated in FIG. 10, the relationship network system 1000 includes a relationship processor 1030 which is responsible for, among other tasks, creating relationship vectors for the data in the information database 1020. These relationship vectors are then stored in the relationships database 1040. In certain embodiments, the relationship processor 1030 runs periodically and collectively analyzes or "mines" the information database in order to create and maintain the relationships database 1040 in response to new data that may be stored in the information database 1020.

In response to a query received by the information acquisition processor 1015, the relationship network system 1000 sends the query to the network generator 1050, which in addition to the query receives relationship vector information from the relationships database 1030 in order to generate a relationship network based on the query. In certain relationship network system embodiments, a set limit can be placed on the number of relationships that are created in order to address the substantially large amounts of relationships that can be created in web space, as discussed above. Any one of the relationship processor, the relationship database, the information database, and/or the web server may comprise a means for providing a human generated list archive comprising a plurality of ordered human generated lists. The web server may further comprises a means for receiving a user query. The network generator 1050 may, in certain embodiments, provide a means for matching a query against the human generated list archive to retrieve a recommendation.

The resulting relationship network is then sent to the query results processor 1060, which processes the results, optionally creates a visual representation of the relationship network, and sends this data to the information acquisition processor 1015. The results data may then be returned to computing devices 1020 that submitted the query via the Internet. Thus, the query results processes and the web server may provide a means for providing a recommendation to the user.

4. EXAMPLE

Music Database

One embodiment may be implemented to discover relationships between human-generated content related to a database of music. Some examples of human-generated content relating to music are playlists, blogs, and recommendation lists. The system may determine relationships between music files based on their location within a directory or repository over a large data space, such as the Internet. This relationship data, which may include information such as the artist, album, title of the song and year of release, may be stored in associative memory modules, and then be transferred into query object vectors, as described above. Then, in response to a query, such as for an artist or a song, the system may create and present a relationship network of related artists or songs to the query and optionally visualize the relationship network.

5. OVERVIEW OF HUMAN GENERATED LISTS

According to one embodiment, a system and method for analyzing an electronic database containing HGLs will now be disclosed. Examples of HGLs may include compilation CDs, recommendation lists, academic reading lists, wish lists, DJ sets, playlists, 'favorites' lists from various web pages, and the like. HGLs such as these contain intrinsic intelligence because they are created from objects known to be related. These relationships may be non-obvious, such that a standard search would not distinguish between a valuable relationship and a trivial relationship. Additionally, many important relationships may initially be indirect or hidden. However, when utilized with an archive of such lists containing intrinsic relationship intelligence, valuable non-obvious and hidden relationships may be determined.

Figure 11:
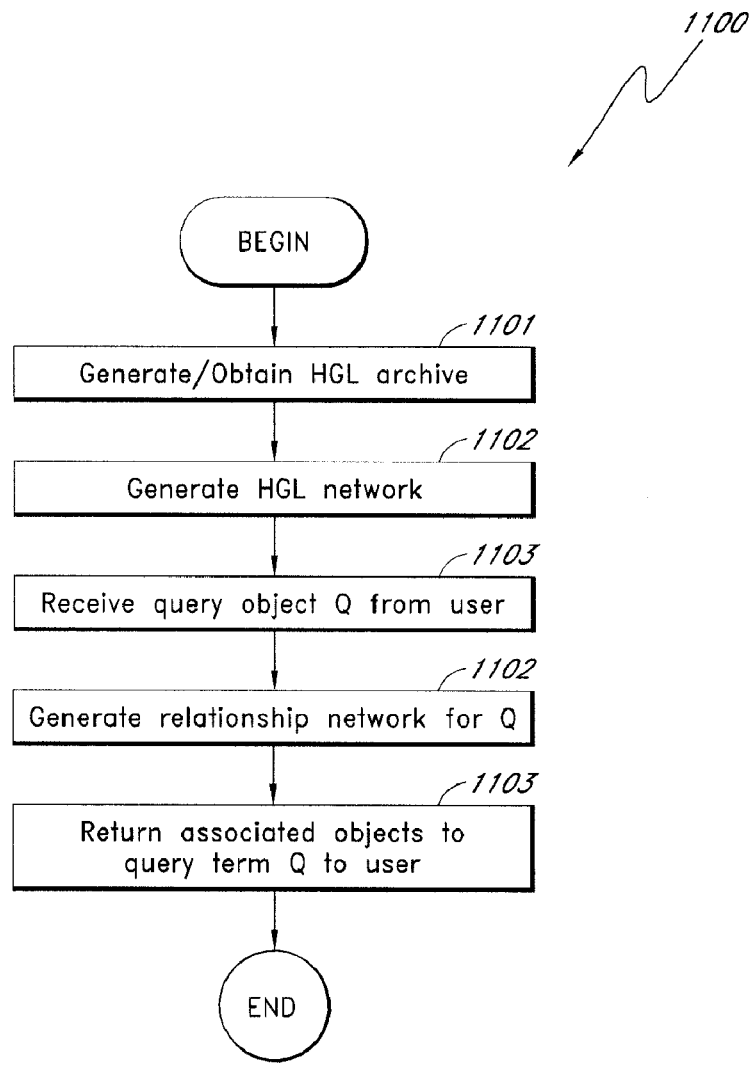
FIG. 11 is a flow chart showing an overview for one embodiment of a system for scoring relationships between objects in Human Generated Lists and a user query.

FIG. 11 is a flow chart showing a process 1100 for analyzing HGLs to find objects associated with a user provided query object. In some embodiments, this represents finding recommendations such as songs, movies, or books based upon the query object provided by the user.

The process 1100 begins at state 1101 where an HGL archive is generated or obtained. An HGL archive is generated by analyzing an electronic database to find HGLs within the electronic database. For example, HGLs are found by identifying multiple objects belonging to certain classes within a defined context window. As described in more detail below, membership in a class may be determined by reference to a pre-existing database.

When an HGL archive has been generated it may be stored, and the stored archive may be utilized in response to other user queries. Storing an HGL archive may provide several benefits. First, obvious performance benefits are obtained by storing the HGL archives because the electronic database is not searched and analyzed for each query. For similar reasons, the HGL network may be stored rather than generated for each query as described below. Second, storing the HGL archive allows for the collection of data that is available only temporarily. Content available on the internet is often by its nature transient. For example, blog entries, reviews, and the like may be available only for a short time before being moved or deleted to make room for new content. Because HGL information becomes statistically relevant only when a large amount of such information is available, it is useful to store this otherwise transient information for future analysis. In these embodiments, the HGL archive may be updated to find newly generated HGLs.

Once a new HGL archive has been generated or a stored archive has been obtained, the process 1100 proceeds to state 1102. At state 1102, an HGL network is generated based upon the archive. The network is constructed in a manner similar to that discussed above. Relationship vectors are generated by analyzing the distance between objects in an HGL. These relationship vectors are stored along with related information in AMMs. QOVs are constructed based upon these AMMs to form the HGL network.

Process 1100 then proceeds to state 1103, in which a query object is received from the user. The query object may be, for example, the name of a song or a musical artist. In other embodiments, the query object is the title of a book, an actor or actress, a stock symbol, an electronic device, or the like. In a preferred embodiment, the user provides a query object so that the user may receive a recommendation. For example, the user may provide a book title he or she enjoys seeking recommendations for other books the user might be interested in purchasing or reading. In other embodiments the user provides some other query object in order to find related objects.

At state 1104, a relationship network is generated for the query object. In order to generate the relationship network, a QOV corresponding to the query object and generated at state 1102 is retrieved. The QOV may then be filtered and expanded, and expanded AOVs may be created to form the relationship network. When the relationship network has been created, the process proceeds to state 1105.

At state 1105, related objects are returned. The objects returned are those most related to the query object as determined by reference to the relationship network. In different embodiments, varying numbers or types of objects may be returned to the user. For example, results may only be provided for objects of a particular class or subclass. The results may also be returned to the user in different forms. In some embodiments, the results are returned in the form of a search engine results page. In other embodiments, a visual representation of the relationship network is returned. In another embodiment, the results are displayed on a web page with hyperlinks allowing the user to purchase songs, albums, books, movies, or other recommended objects related to the query object.

An overview of the process 1100 for analyzing HGLs has been given above. More detailed explanations of specific embodiments will now be given. It will be understood that these processes described below, and the process 1100 in general, can be performed in a number of ways including variations not specifically described here without departing from the scope and spirit of the current invention.

6. COLLECTING HUMAN GENERATED LISTS

Figure 12:
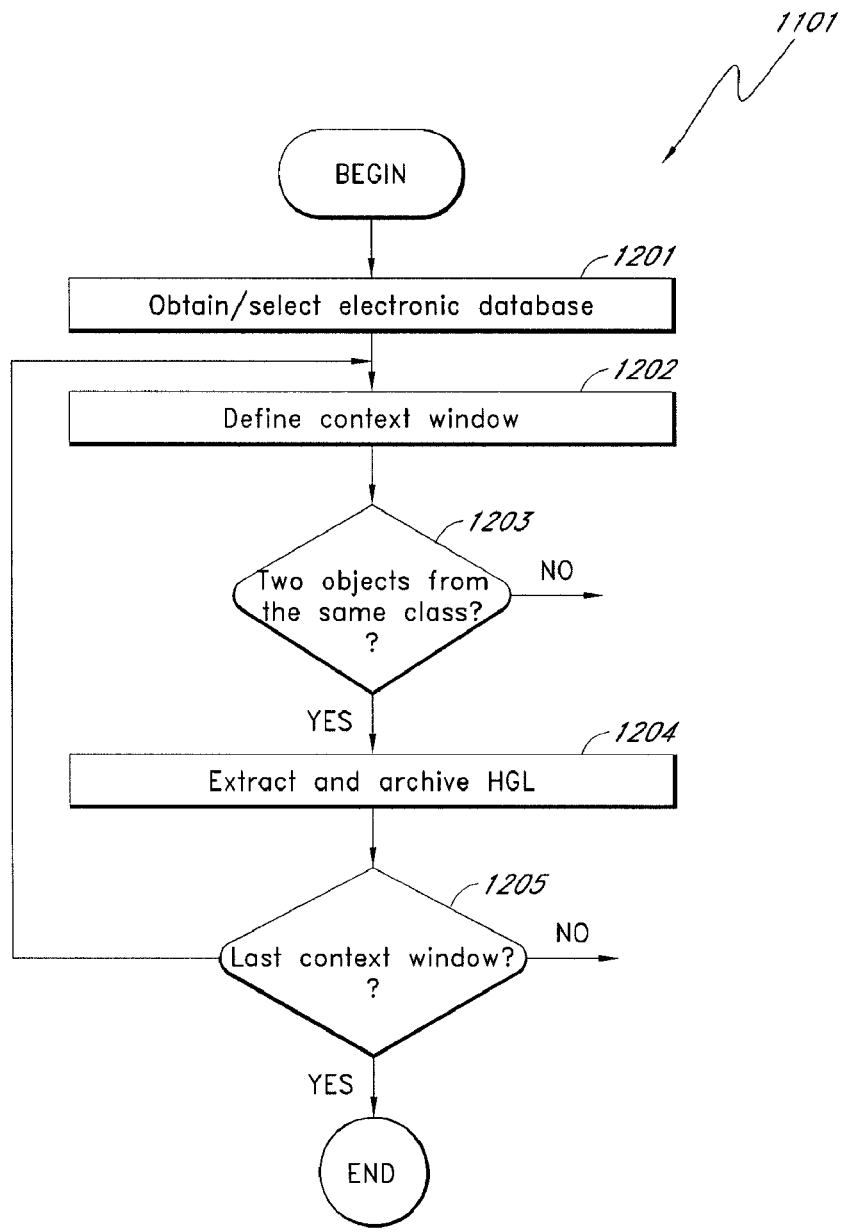
FIG. 12 is a flow chart for one embodiment of a system for extracting Human Generated Lists from an electronic database.

FIG. 12 is a flow chart showing a process 1101 for generating an archive of HGLs according to one illustrative embodiment. At state 1201 an electronic database is obtained or selected. The electronic database may include known repositories of various classes of valuable content. For example, the electronic database may include content contained in a number of 'favorites' lists located on various blogs. In other embodiments, HGLs may be extracted from non-list formatted content such as album, book, or movie reviews. The electronic database may comprise any collection of these or similar materials in different embodiments.

It is not necessary that each document in an electronic database contain HGL information. For example, the electronic database is the Internet in one embodiment. In this embodiment, the electronic database includes a large number of documents having HGL information and a large number of documents that do not have HGL information. The selected electronic database is analyzed and the documents sorted as described below so that the relevant information is extracted. After the electronic database is selected at state 1201, the process 1101 moves to state 1202.

At state 1202, a context window is defined over a portion of the digital content of the electronic database. The context window may encompass any amount of digital content. In a preferred embodiment, the context window encompasses one document within the electronic database. For example, the electronic database contains a collection of web pages and a context window is defined over a single web page. In another embodiment, the context window may contain a subsection of a document or object within the electronic database. In other embodiments the context window may include multiple documents or the entire electronic database.

Figures 13A, 13B, 13C:
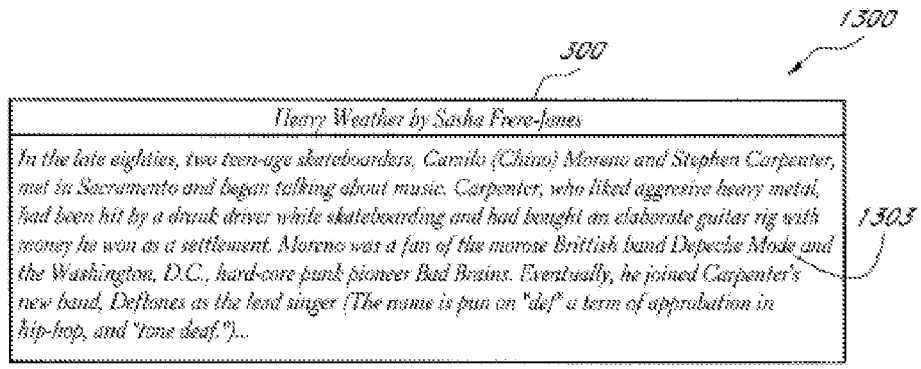
FIG. 13A shows a context window defined over a sample document.
FIG. 13B shows a sample representation of a Human Generated List extracted from the context window of FIG. 13A.
FIG. 13C shows a sample representation of a Human Generated List extracted from the context window of FIG. 13A.

An example of a context window according to one embodiment is shown in FIG. 13A. FIG. 13A shows a context window defined over a document in an electronic database. Here, the electronic database is the Internet, and the document is a web page including a review of a musical album. For illustrative purposes, only a portion of the content of the page is shown in FIG. 13A. It will be understood that the context window may include the entire content of the page. In other embodiments, a context window is defined over only a portion of the page, and the page is further analyzed by iteratively defining and progressing context windows through the document. In some embodiments, successive context windows contain some overlapping content. After the context window has been defined, the process 1101 continues to decision state 1203.

The context window is analyzed at decision state 1203 to determine if the content defined by the window contains an HGL. An HGL is preferably identified by the existence of two or more objects from the same class within the defined context window. In a preferred embodiment, classes comprise objects of the same type, such as songs, movies, or the like. In other embodiments, classes may be defined based on file types, related terms, visual or audio characteristics, or any other trait. Membership in a class may be determined across different types of objects. For example, if musical albums comprise a class of objects, then objects in this class may include audio data associated with a musical album, textual data describing a musical album, or text identifying an image associated with the album such as an album cover. Thus, a class may be musical albums, and a context window containing two musical albums may be considered an HGL. Alternatively, more objects from one class may be required to determine whether the context window encompasses an HGL.

Membership in a class may be determined, for example, with reference to a pre-existing database. Such a pre-existing database may include information such as lists of musical album titles, musical artists, song titles, musical genres, and also information relating these objects to one another. This information may be used to define classes. For example, a class may be defined by objects in the list of musical artists contained in the pre-existing database. In other embodiments, the information contained in the pre-existing database is actually contained in multiple pre-existing databases and includes information relating not just to music but to a wide variety of themes. For example, the pre-existing database may include class information relating to books, movies, technical areas, consumer products, corporate information, and the like. A pre-existing database may comprise a public database as well as private or user-created databases containing class information.

If a context window does include an HGL, the content is extracted and archived at state 1204 for analysis. The extracted objects are ordered to identify relationship information. Generally, extracted objects are ordered according to the order they appear in the context window. Examples of representations of extracted HGLs ("HGL modules") are shown in FIGS. 13B and 13C. FIG. 13B shows HGL module 1310 obtained by extracting objects from context window 1300 that are in the 'musical artist' class. HGL module 1310 comprises document ID 1311, ranking 1312, objects 1303, 1305, and 1306, and class 1313. Document ID 1311 is the title of the article in which the objects were found. In other embodiments, the document ID 1311 may be some other identifier such as a URL address. Ranking 1312 may reflect the order in which the objects appear in the document. In many cases, objects ranked higher in an HGL appear close to the beginning of a document. The ranking may be used, for example, in calculating a relationship score for two objects when the HGL is analyzed, as discussed below. In some embodiments a ranking is not used. Objects 1303, 1305, and 1306 of the HGL module 1310 were found by analyzing the context window 1300. In the case of a text document, such as the review in FIG. 13A, this may involve comparing segments of text against the objects defined by the pre-existing database. Here, the terms "Depeche Mode," "Bad Brains," and "Deftones," appear in the text of the review. In the embodiment shown, each of these terms is an object found in the list of musical artists in the pre-existing database. Thus, each of these objects has been extracted and placed in HGL module 1310.

FIG. 13C shows HGL module 1320 containing 'music' objects. The 'music' class in this embodiment contains a number of subclasses, including 'musical genre', 'musical artist', and 'musical album'. As can be seen by comparing the embodiments shown in FIGS. 13B and 13C, a group of objects used as a class in one embodiment may be used as a subclass and combined with other subclasses to form a new class in other embodiments. When multiple subclasses are used, the HGL archive may be used to reveal relationships between objects in different subclasses. This concept may be utilized to provide related objects of different classes in response to a user query. For example, a user providing a song title may be shown related books and movies. In some embodiments, objects of any class occurring in the pre-existing database are utilized to form HGL modules. In certain embodiments, relationships between objects of the same subclass may be favored when the HGL archive is analyzed, as discussed below.

In different embodiments, HGL modules may be generated for varying types of classes. For example, context window 1300 contains multiple 'musical artist' class objects 1303, 1305, and 1306 that may be extracted to form an HGL module similar to that shown in FIG. 13B. Context window 1300 also contains multiple 'musical genre' class objects 1302, 1304, and 1307 that may be extracted to form a separate HGL module. Unlike the HGL module 1320 shown in FIG. 13C, this HGL module may contain only 'musical genre' class objects. Both of these HGL modules, each containing different types of objects, may then be stored as separate HGL modules within the same HGL archive. In some embodiments, an HGL module is generated in this way for each defined class of objects that constitutes an HGL. In other embodiments, only particular classes of objects are selected to extract HGL information. For example, in some embodiments the HGL network may be generated after the query object is provided by the user in process 1100, and the HGL network may be formed only for objects sharing the same class as the query object.

After the content is archived at state 1204, or if no HGL was found at decision state 1203, process 1101 proceeds to decision state 1205. At decision state 1205 the process 1101 determines if the current context window is the last context window for the electronic database. If context windows have been generated and analyzed over the entire electronic database according to process 1101, then the current context window is the last and process 1101 ends. However, if the electronic database has not been completely analyzed, then the process 1101 returns to state 1202 and defines a new context window. The order in which context windows are defined is generally by incrementally progressing through the database. However, the order in which context windows are created may be based on other factors such as types of data, size, expected relevance, or the like. Once a new context window is created according to state 1202, the process 1101 continues as described above through steps 1203 and 1205, and step 1204 when appropriate. The process loops until the last context window is analyzed. When the process 1101 has finished, an archive will have been created containing all of the desired HGLs from the electronic database.

7. ANALYZING HUMAN GENERATED LISTS AND CREATING AN HGL NETWORK

The HGL modules contained in the archive created by process 1101 may be analyzed to create an HGL network utilizing methods similar to those described in sections 1 and 2 above. Initially, the archive may be selected as an electronic information database for analysis. Relationship vectors may then be generated for the objects in the archive.

This is accomplished by retrieving HGL modules from the archive. Typically, a single HGL module is analyzed at one time. However, in some embodiments relationship data may be measured across multiple HGL module.

Relationship vectors may be generated based upon the distance of each object from other objects in each of the HGL modules. To do so, a first core object in an HGL module may be selected. A distance score may be computed for the first core object with reference to a second associated object based on their relative position in the HGL module. For example, the object 1303 in FIG. 13B may be selected as a core object. The object 1305 may then be selected as the associated object. A distance score will be generated for this relationship. Using the Fibonacci sequence in reverse to determine the distance score as discussed above in section 1, the distance score for this relationship would be 0.618, because the objects are one object apart. By way of comparison, the distance score between objects 1303 and 1306 in FIG. 13B would be 0.382 using this method. In other embodiments, information may be stored in the HGL module such that the number of terms between objects is known and used to compute the distance score, rather than or in conjunction with the number of objects. For example, in context window 1300 the objects 1303 and 1305 are eight terms apart, and this distance may be used as part of the computation of the distance score. In some embodiments, stop-words are not included in this calculation. In that example, the objects 1303 and 1305 are six terms apart for the purposes of calculating a distance score.

The distance score for each association may be used to create or modify an entry in the relationship vector corresponding to the core term. In this example using HGL module 1310, if the relationship vector corresponding to object 1303 does not yet have an entry for the association between objects 1303 and 1305, an entry would be created corresponding to the determined distance score. If an entry already exists in a relationship vector for an association between the selected core object and an associated object, the new distance score may be summed with the previous score for that entry. This information may be determined for each object by cycling through the objects in the HGL module and selecting each object in turn as the core object. In this way distance scores are computed for each association and relationship vectors are created for each object.

This process is performed for each HGL module across the entire collection of HGL modules and stored in the form of AMMs representing the objects in the HGL modules. AMMs contain information corresponding to the relationship vector for an object, as well as additional information. For example, an AMM may also identify the total number of associations for the given object, the total number of HGL modules in which it is present, or other information.

AMMs may be used to create QOVs for each object in the HGL archive. The QOVs contain relationship scores associated with other objects. The relationship scores are based in part on the distance scores, but may also take into account other factors. For example, as described in section 1, the relationship scores may be determined by applying a bias function to the distance score to emphasize either unique or common associations. In the context of HGLs, other bias functions may be utilized which emphasize associations occurring either near the top or bottom of an HGL, or emphasizing associations based upon the subclass of each object. These scores may be used to discover the existence of a relationship between different HGLs as well as objects within the HGL archive. Additionally, the scores may provide a quantitative measure of the strength of these relationships and the underlying context. This information allows for further analysis of the HGLs to retrieve useful information, such as by searching the HGL relationship network.

8. SEARCHING THE HUMAN GENERATED LIST NETWORK

Having formed QOVs for the objects in the HGLs, the HGL network may be searched to provide other objects related to a query object. In some embodiments, techniques similar to those described above, such as those described with reference to FIG. 7, may be used. If a user is interested in an object, searching the HGL network will return objects that are highly relevant and contextually related to the query object. These related objects may take the form of recommendations related to the query object. For example, if a user is interested in a particular musical album, then searching the HGL network may return other musical albums that are related to the query. In the context of HGLs, these relationships may reveal what other albums those interested in the first album enjoyed, or other albums compared to the first album in various reviews.

The search methods described here may also advantageously reveal hidden relationships. For example, a user may provide a musical album 'A' as a query object. If the album 'A' appears in several HGLs with musical albums 'B' and 'C', those objects may be returned. According to ordinary search methods, if the album 'A' never appears in the same HGL as album 'D', then album 'D' would not be returned with 'A', However, using the search methods described here, if the album 'D' appears repeatedly with the albums 'B' and 'C' in different HGLs, then album 'D' may be returned as a recommendation. Thus, hidden and non-obvious relationships may be revealed, in addition to direct relationships. Furthermore, these relationships can be quantitatively scored to determine their relevance.

One embodiment of a search process capable of discovering such hidden relationships will now be described. In order to return related objects and recommendations, a user first provides a query object, such as an object in an HGL. The QOV that corresponds to the query object is retrieved from the HGL network. In some embodiments, the QOV may then be filtered. In some embodiments, the QOV may be filtered based on a vector containing objects selected directly or indirectly by the user. For example, a filter may be constructed based on known user rankings of musical albums or based upon a list of songs that the user already owns. In other embodiments, a filter is used to return objects from only certain classes.

The QOV may then be expanded in some embodiments. For example, the expanded QOV may include the thirty highest scoring associated objects from the original QOV, along with three of the highest scoring associated objects from each of the AOVs for those thirty objects.

As described with reference to FIG. 8C, Expanded AOVs may be created from the original QOV by expanding the strongest objects in that QOV into their own AOVs. The strongest objects from each of these vectors may be included in each corresponding expanded AOV, and those objects may also be expanded into second dimension AOVs. The strongest objects from those second dimension AOVs are also included in the expanded AOV and are expanded into third dimension AOVs. The strongest objects from the third dimension AOVs may be included in the corresponding expanded AOV.

These expanded AOVs may then be compared with the expanded QOV to determine the relevance of each associated object. In some embodiments, this process may include forming a vector of associated objects from the intersection of each of the expanded AOVs with the expanded QOV. In some embodiments, a similarity score may be generated for the AOVs with the expanded QOV according to one of the methods described in section 2. Still other embodiments score associated objects according to the other methods described above.

The most relevant objects are determined according to one of the methods described or a similar method, and those objects may be returned to the user. Alternatively, a visual representation of the query on the HGL network may be returned. In some embodiments, the related objects are returned as a search engine results page. The results may be actively linked to related media, opportunities to purchase the related objects, or some other related object. For example, a user may provide a movie as a query object, and recommended movies may be displayed on a search engine results page along with an image representing the recommended movies, summaries of the movies, and links allowing the user to either purchase, download, or rent the related movies. Regardless of how it is formatted, a user is returned a collection of objects related to the initial query object, including objects that may have had hidden or indirect relationships.

9. EXAMPLE

Music Recommendation Service

Figure 14:
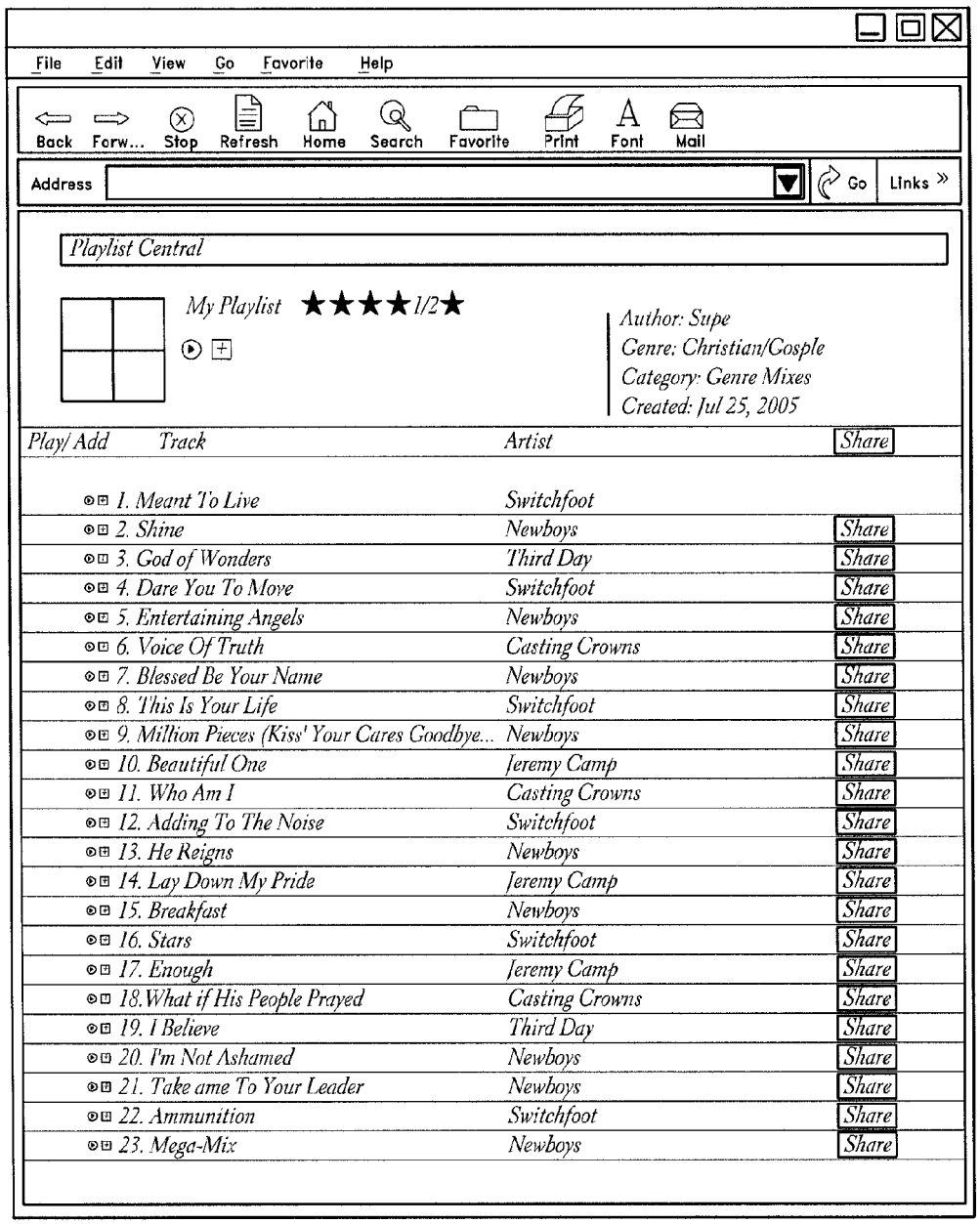
FIGS. 14 and 15 each show a playlist containing a variety of song names and the associated musical artists.
Figure 15:
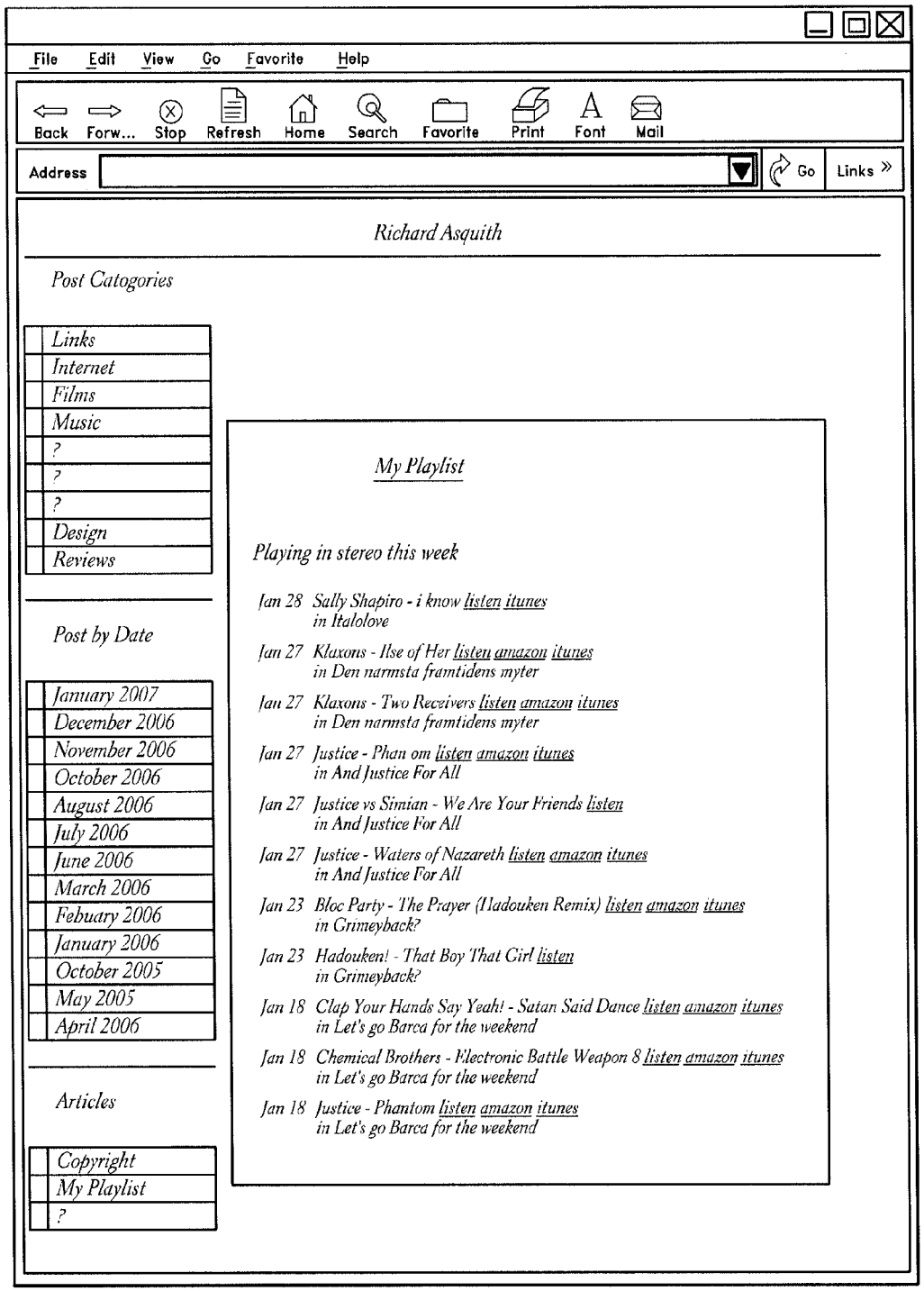
Figure 16:
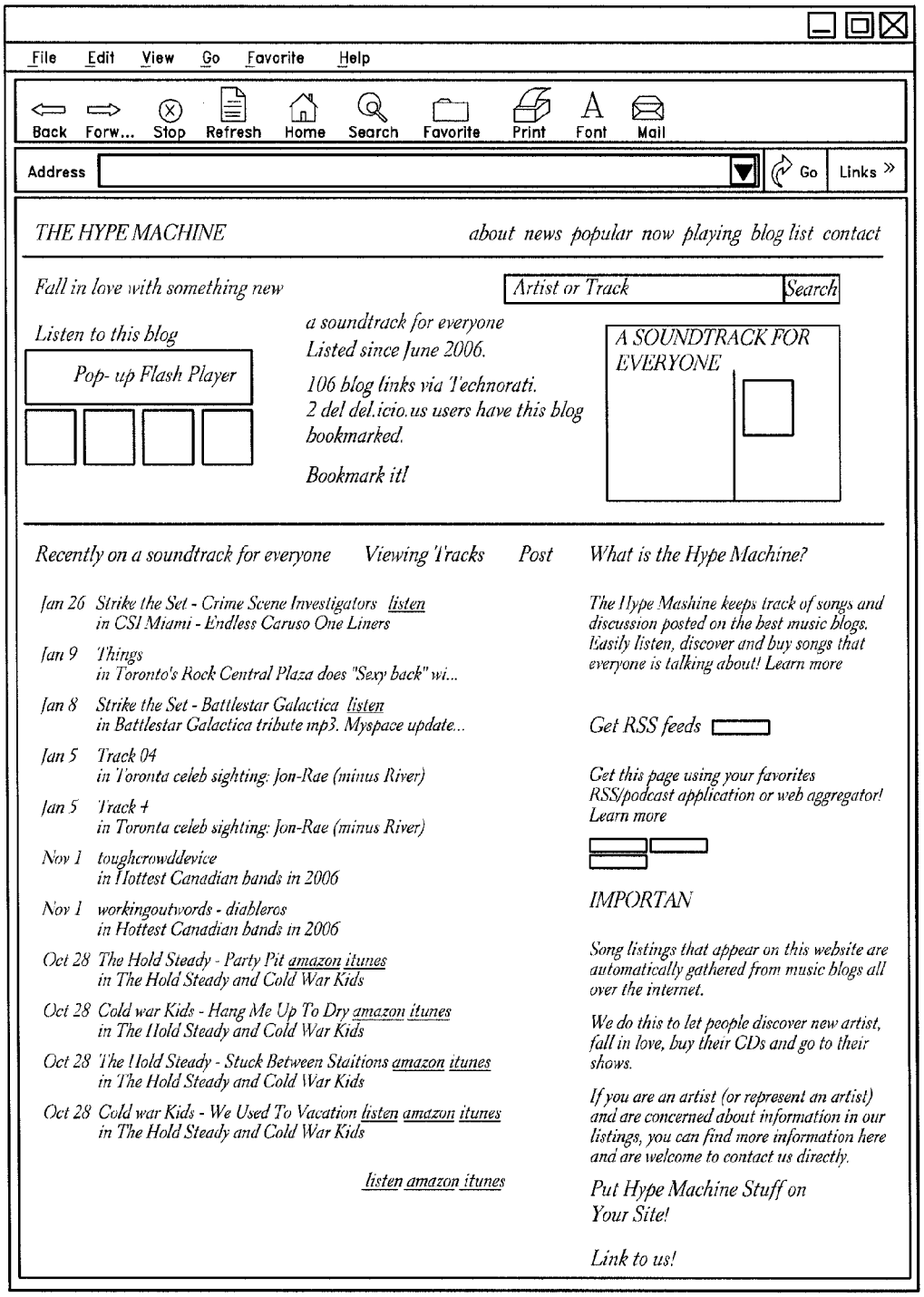
FIG. 16 shows a list of songs recently posted on a blog.
Figure 17:
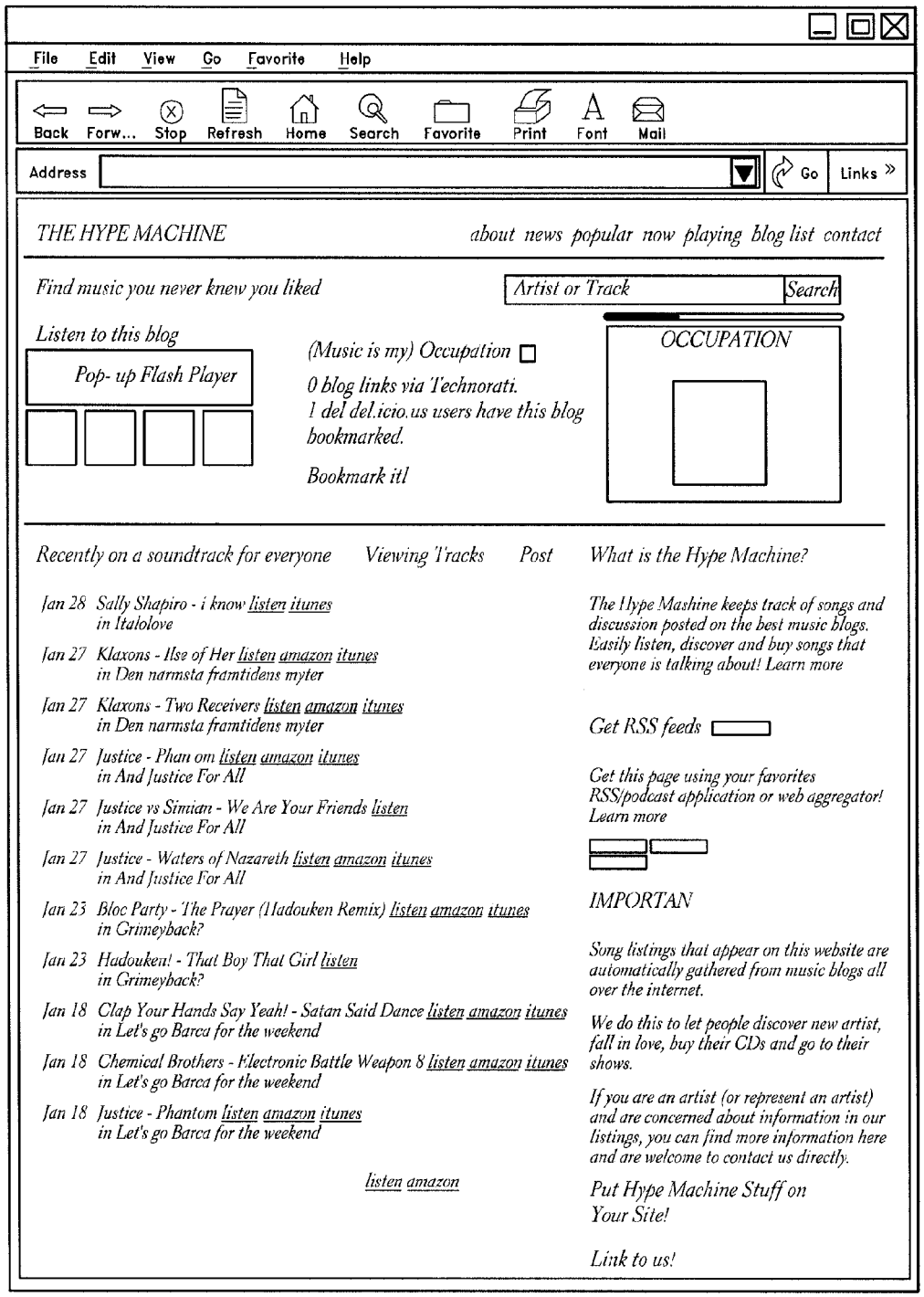
FIG. 17 shows a web page comprising a number of songs extracted from a variety of blogs in the same way that the songs were extracted from a single blog as shown in FIG. 16.

Another embodiment may be implemented to recommend music to a user in response to a user provided search term, such as a song title, musical artist, or musical album. In this embodiment, an HGL archive is created by searching a collection of known repositories of HGL content available publicly on the internet. For example, web pages containing blogs, music reviews, playlists, and the like are analyzed. FIGS. 14-17 show specific examples of websites containing music related HGL information available on the Internet and which can be analyzed according to certain embodiments. FIGS. 14 and 15 each show a playlist containing a variety of song names and the associated musical artists, The playlists are examples of HGLs according to some embodiments. FIG. 16 shows a list of songs recently posted on a blog. The songs, as listed on the site shown, or as originally posted on the blog, constitute an HGL according to one embodiment. FIG. 17 shows a web page comprising a number of songs extracted from a variety of blogs in the same way that the songs were extracted from a single blog as shown in FIG. 16. In some embodiments, this listing of recently posted songs across many blogs may comprise an HGL.

In order to extract HGLs from web pages such as those shown in FIGS. 14-17, a context window is created over each web page. If a web page is found to contain at least two musical class objects, including textual data representing an artist, album, or the like, then the relevant objects are extracted from that web page and placed in an ordered list. Once each of these ordered lists have been extracted, an HGL network is formed by scoring the relationships between each object in the lists based upon their relative locations and uniqueness. This HGL network is stored on a server with the content accessible via an internet recommendation page, for example located on a music purchasing website.

A user accesses this recommendation page and provides a query object, such as a song title. A vector corresponding to the song title is found in the HGL network, and that vector is expanded and compared with other vectors to determine and score relationships between the query object and other objects in the HGL network. Those objects that have a relatively strong relationship to the query object are returned to the user. For example, the user is taken to a recommendation results page which displays songs, musical albums, and musical artists that the user might enjoy based upon the query object.

10. CONCLUSION

All of the features described above may be embodied in, and automated by, software modules executed by general purpose computers. The software modules may be stored in any type of computer storage device or medium. All combinations of the various embodiments and features described herein fall within the scope of the present invention.

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention. The scope of the present invention is defined only by reference to the appended claims.

What is claimed is:

1. A computer-implemented method of providing a recommendation in response to a user query, the method comprising:
   providing a human-generated list archive comprising a plurality of ordered human-generated lists, wherein each human-generated list comprises a plurality of objects and each object has an associated rank;
   determining a first relationship between objects in a first human-generated list of the plurality of ordered human-generated lists, wherein the first relationship contains one or more relationship scores based at least in part on a first plurality of object ranks based on the first human-generated list;
   determining a second relationship between objects in a second human-generated list of the plurality of ordered human-generated lists, wherein the second relationship contains one or more relationship scores based at least in part on a second plurality of object ranks based on the second human-generated list;
   determining a third relationship between objects in the first and second human-generated lists based upon the first and second relationships;
   receiving a user query, wherein the user query is associated with a query object vector;
   matching the query against the human-generated list archive to retrieve a recommendation, wherein matching comprises:
     retrieving the query object vector,
     creating an associated object vector by expanding the query object vector, and
     comparing the query object vector to the associated object vector to determine a recommendation, wherein the recommendation is based at least in part on the first, second, and third relationships; and
   providing the recommendation to the user.

2. The computer-implemented method of claim 1, further comprising providing a list archive comprising non-human-generated lists, wherein matching the query further comprises matching the query against the non-human-generated list archive.

3. The computer-implemented method of claim 1, wherein the plurality of object comprises data indicative of a human-compiled collection of non-randomly ordered objects.

4. The computer-implemented method of claim 1, wherein the query object comprises data related to at least one of a song title, an artist, an album title, or a genre.

5. The computer-implemented method of claim 1, wherein determining the first relationship comprises constructing a first relationship vector analyzing a distance value between objects in the first human-generated list.

6. The computer-implemented method of claim 5, wherein the distance value is based at least in part on a number of words separating the objects in the human-generated list.

7. The computer-implemented method of claim 6, wherein the number of words excludes stop-words.

8. The computer-implemented method of claim 1, wherein determining the first relationship comprises selecting a core object and generating a relationship vector related to the core object.

9. The computer-implemented method of claim 8, wherein the relationship vector is based on distance values computed with respect to an associated object.

10. The computer-implemented method of claim 9, wherein the distance value is based at least in part on a number of words separating the core object and the associated object.

11. A system for providing recommended media objects in response to a user query, comprising:
    a relationship database comprising a human-generated list archive, the human-generated list archive comprising a plurality of ordered human-generated lists, wherein each human-generated list comprises a plurality of objects and each object has an associated rank;
    a relationship processor configured to:
        determine a first relationship vector between objects in a first human-generated list of the plurality of ordered human-generated lists, wherein the first relationship contains one or more relationship scores based at least in part on a first plurality of object ranks within the first human-generated list,
        determine a second relationship between objects in a second human-generated list of the plurality of ordered human-generated lists, wherein the second relationship contains one or more relationship scores based at least in part on a second plurality of object ranks within the second human-generated list, and
        determine a third relationship between objects in the first and second human-generated lists based upon the first and second relationships; and
    a web server configured to receive a user query;
    a network generator for matching the query against the human-generated list archive to retrieve a recommendation, wherein the network generator is configured to:
        generate a relationship network based on the first, second, and third relationship vectors,
        generate a query object vector associated with the query,
        create an associated object vector by expanding the query object vector, and
        compare the query object vector to the associated object vector to determine a recommendation, wherein the recommendation is based at least in part on the first, second, and third relationship vectors; and
    a web server configured to provide the recommendation to the user.

12. The system of claim 11, further comprising an information database, wherein the information database is accessible by the web server.

13. The system of claim 12, further comprising:
    a query results processor configured to:
        create a visual representation based on the relationship network; and
        transmit the visual representation to the web server.

* * * * *